US009154723B2

(12) United States Patent
Tsuji et al.

(10) Patent No.: US 9,154,723 B2
(45) Date of Patent: Oct. 6, 2015

(54) RECEIVING TERMINAL, AND CONTENT EXPORTING METHOD

(75) Inventors: Hisashi Tsuji, Osaka (JP); Takuya Nishimura, Osaka (JP); Kensuke Satoh, Osaka (JP); Hirokazu Tamano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 452 days.

(21) Appl. No.: 13/533,101

(22) Filed: Jun. 26, 2012

(65) Prior Publication Data

US 2012/0275758 A1     Nov. 1, 2012

Related U.S. Application Data

(63) Continuation of application No. PCT/JP2010/006544, filed on Nov. 8, 2010.

(30) Foreign Application Priority Data

Dec. 28, 2009    (JP) ................................ 2009-297257
Dec. 28, 2009    (JP) ................................ 2009-297534

(51) Int. Cl.
*H04N 5/775*      (2006.01)
*H04N 5/765*      (2006.01)
(Continued)

(52) U.S. Cl.
CPC ............. *H04N 5/765* (2013.01); *H04N 5/913* (2013.01); *H04N 7/17318* (2013.01);
(Continued)

(58) Field of Classification Search
CPC ..................................................... H04N 5/765

USPC ................................. 386/230, 252, E09.011
See application file for complete search history.

(56) References Cited

U.S. PATENT DOCUMENTS

| 2006/0117105 | A1 | 6/2006 | Lesenne et al. | |
| 2009/0043692 | A1* | 2/2009 | Pippuri et al. | ................... 705/39 |
| 2009/0169180 | A1* | 7/2009 | Shimada | ....................... 386/124 |

FOREIGN PATENT DOCUMENTS

| JP | 2002-140307 | 5/2002 |
| JP | 2003-101988 | 4/2003 |

(Continued)

OTHER PUBLICATIONS

International Search Report issued Nov. 30, 2010 in corresponding International Application No. PCT/JP2010/006544.

*Primary Examiner* — Hung Dang
*Assistant Examiner* — Girumsew Wendmagegn
(74) *Attorney, Agent, or Firm* — Wenderoth, Lind & Ponack, L.L.P.

(57) ABSTRACT

A receiving terminal includes a data acquiring unit which acquires from the content server information that is required for the export of the content and that includes information about a capability required for the receiving terminal and information about a capability required for the removable medium. A propriety judgment unit compares the information about the capability required for the receiving terminal with information about a capability the receiving terminal possesses, compares the information about the capability required for the removable medium with information about a capability the removable medium possesses, and judges whether or not the export processing of the content can be performed. A control unit makes a processing relevant to a purchase of the content or to the export of the content perform, according to a judgment result by the propriety judgment unit.

6 Claims, 14 Drawing Sheets

(51) Int. Cl.
  *H04N 5/913* (2006.01)
  *H04N 7/173* (2011.01)
  *H04N 21/2543* (2011.01)
  *H04N 21/432* (2011.01)
  *H04N 21/433* (2011.01)
  *H04N 21/436* (2011.01)
  *H04N 21/4627* (2011.01)
  *H04N 21/488* (2011.01)
  *H04N 21/8355* (2011.01)
  *H04N 9/82* (2006.01)

(52) U.S. Cl.
  CPC ...... *H04N 21/2543* (2013.01); *H04N 21/4325* (2013.01); *H04N 21/4334* (2013.01); *H04N 21/43622* (2013.01); *H04N 21/4627* (2013.01); *H04N 21/4882* (2013.01); *H04N 21/8355* (2013.01); *H04N 9/8205* (2013.01); *H04N 2005/91364* (2013.01)

(56) References Cited

FOREIGN PATENT DOCUMENTS

| | | |
|---|---|---|
| JP | 2005-57700 | 3/2005 |
| JP | 2006-512689 | 4/2006 |
| JP | 2009-159172 | 7/2009 |
| WO | 2007/125681 | 11/2007 |

* cited by examiner

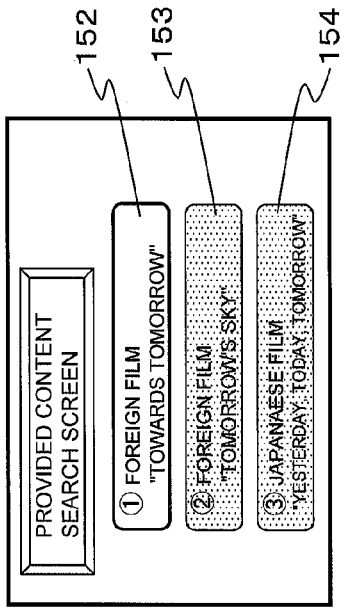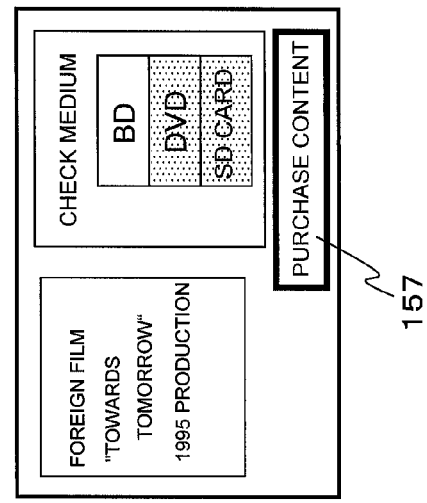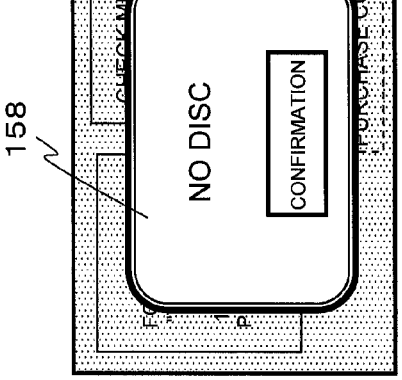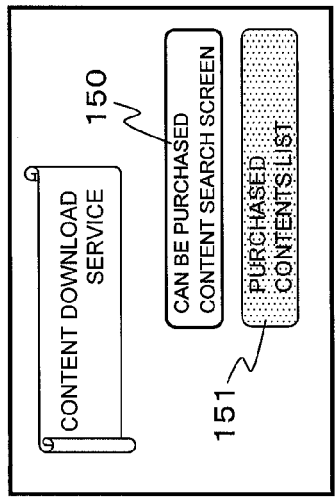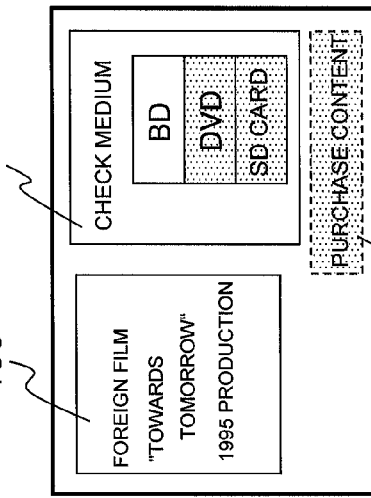

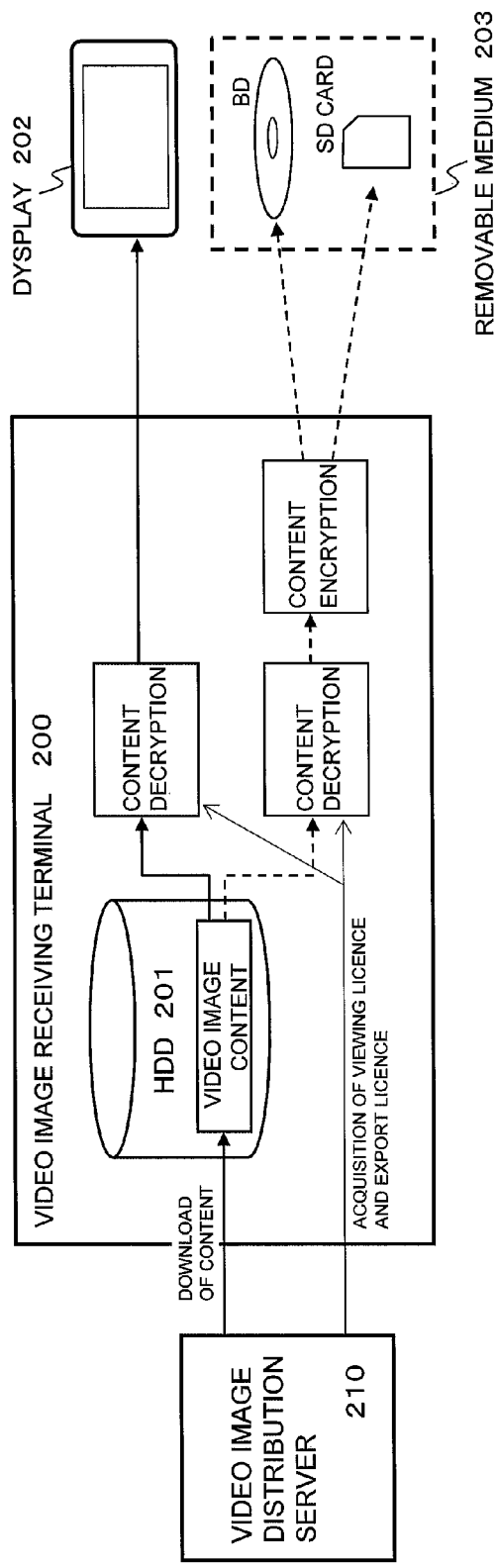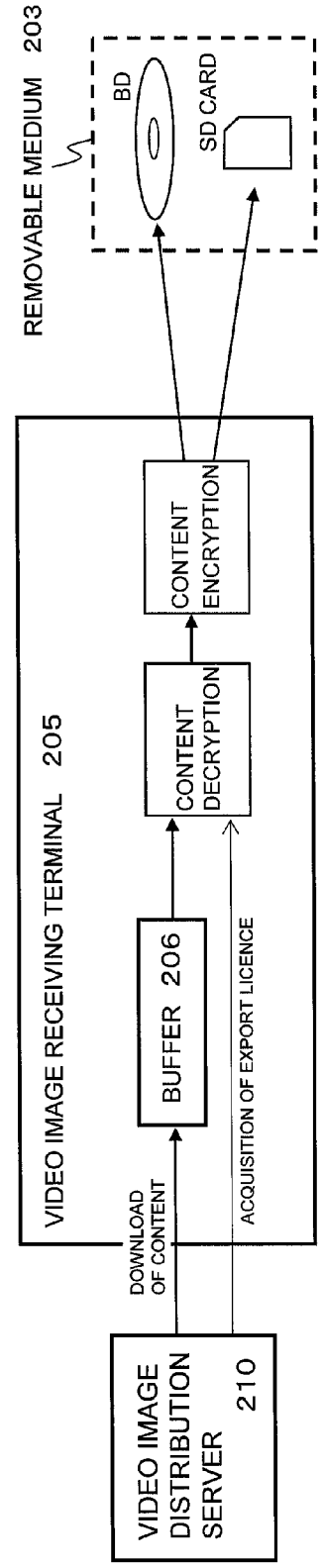
FIG.14 (A) PRIOR ART
FIG.14 (B) PRIOR ART

RECEIVING TERMINAL, AND CONTENT EXPORTING METHOD

CROSS-REFERENCE TO RELATED APPLICATIONS

This application is a continuation application of PCT International Patent Application No. PCT/JP2010/006544 filed Nov. 8, 2010, claiming the benefit of priorities of Japanese Patent Application No. 2009-297257 filed Dec. 28, 2009 and Japanese Patent Application No. 2009-297534 filed Dec. 28, 2009, all of which are incorporated by reference herein in their entirety.

BACKGROUND OF THE INVENTION

1. Field of the Invention

The present invention relates to a receiving terminal, a content exporting method and the like, by which a video image content, a sound content or the like is downloaded from a distribution server to the receiving terminal through a communication network and the content is furthermore exported to a removable medium connected to the receiving terminal.

2. Related art of the Invention

In recent years, a video image distribution service which uses a communication network (communication line) has spread. In such a video image distribution system which includes a video image distribution server distributing a video image content or the like, a communication network consisting of a network outside a house, such as an Internet, and a network in the house, a video image receiving terminal apparatus connected to the network in the house (hereafter, expressed as a "video image receiving terminal"), and the like, a user can use a VOD (Video On Demand) service, IP (Internet Protocol) broadcasting, a video image download service and the like which are provided from a video image server of a communication enterprise or a video image distribution enterprise, by operating the video image receiving terminal used for viewing the video image.

FIG. 14(a) shows a diagram for describing processing details of the video image content, in a conventional video image download service.

In a conventional video image download service, as shown in FIG. 14(a), a video image receiving terminal 200 downloads a video image content from a video image distribution server 210 and stores the content in the built-in HDD 201.

The video image receiving terminal 200 is permitted to play the video image content by a viewing license which is acquired when the video image content is purchased. Then the video image receiving terminal 200 can decrypt and output the video image content stored in the HDD 201. The video image receiving terminal 200 outputs the video image content to a display 202 connected or the like, and the video image content can be viewed. When to write the video image content into another medium is permitted, the video image receiving terminal 200, after decrypting the video image content stored in the HDD 201 and encrypting the decrypted content to export, can also write the video image content into a removable medium 203.

When the video image download service is used, the video image distribution server has to check whether the video image receiving terminal, which is connected to the video image distribution server, can use the download service. This is because a certain error naturally occurs and support to the user is needed, when a video image content is distributed to the video image receiving terminal which cannot use the download service.

As for the video image distribution server and the video image receiving terminal, in order to avoid such a problem, it is desirable to judge whether the download service can be used before the download service is executed. In Japanese Patent Application Laid-Open No. 2006-512689, a method of making an execution propriety judgment of such service is disclosed.

In the execution propriety judgment of service in Japanese Patent Application Laid-Open No. 2006-512689, the video image receiving terminal analyzes data transmitted from the video image distribution server and checks an application program in the video image receiving terminal, which is required in order to use the service provided by the video image distribution server. When the application program exists in the video image receiving terminal and the video image receiving terminal can use the service, the video image receiving terminal continues the execution of the service. When the video image receiving terminal cannot use the service, the video image receiving terminal shows the user the information required in order to use the service such as a method of installing the application.

As described above, the execution propriety judgment of the service by the video image receiving terminal is realized before the service is executed.

In this way, the conventional download service prevents an error during download by checking the propriety of the download service of the video image receiving terminal before the download start.

The conventional download service also provides a video image content export service, in which the video image content, which has been downloaded and recorded in the built-in HDD held in the video image receiving terminal as described above, is written into a removable medium to be brought out and viewed with a portable terminal.

By the way, recently, a direct export service has been used, in which a video image receiving terminal with no HDD downloads a video image content from a video image distribution server, and exports the video image content to a removable medium directly without recording the content in the video image receiving terminal.

FIG. 14(b) shows a diagram for describing processing details of the video image content, in the direct export service.

In the direct export service, a video image receiving terminal 205 records the video image content, which has been downloaded from a video image distribution server 210, in a removable medium 203 directly without storing the content in a built-in HDD 201 or the like.

In the direct export service, as shown in FIG. 14(b), when the video image receiving terminal 205 acquires an export license, the video image receiving terminal 205 is permitted to write the video image content corresponding to the export license into the removable medium 203 directly. While the video image receiving terminal 205 downloads the video image content from the video image distribution server 210, the video image receiving terminal 205 decrypts the video image content through a buffer 206, encrypts the video image content to be exported and writes the video image content into the removable medium 203. The buffer 206 records temporarily a quantity of the data of the video image content required for decrypting and encrypting the content continuously during downloading the video image content. The buffer 206 differs from the HDD 201 of FIG. 14(a), and the video image content is not finally held in the buffer 206.

When the video image receiving terminal does not contain a mass storage HDD which can accumulate the video image content, the video image receiving terminal cannot use the conventional download service as shown in FIG. 14(a). On the other hand, in the direct export service, even a video image receiving terminal which does not contain a mass storage HDD can use the service when the video image receiving terminal can connect with the video image distribution server 210 through the Internet and can write the content into the removable medium 203.

However, the conventional service propriety judgment method for the download service cannot be used as a service propriety judgment method for the direct export service.

In the conventional download service, the capacity check before a start of the download service is not so important because the capacity of an HDD is large enough compared with the size of the video image content.

However, the capacity of a removable medium on which the video image content is recorded in the direct export service is smaller than the capacity of an HDD. Moreover, the copyright protection system has many kinds. Therefore, compared with the conventional download service, in the direct export service, there is a high possibility that an error at the time of download processing occurs.

As shown in FIG. 14(b), the propriety for the direct export service of the built-in HDD does not need to be judged. Because the video image content being downloaded is directly recorded into the removable medium 203, a judgment of the propriety of static capability of the terminal in using the export service is necessary in the first place, and a judgment of the propriety of dynamic capability is also necessary. The judgment of the propriety of dynamic capability is to check whether the direct export service can be used and, for example, it is necessary to check that there is enough space capacity in a current removable medium inserted in the video image receiving terminal, or that the video image receiving terminal can handle the copyright protection system.

Therefore, the conventional propriety judgment for the download service, which doesn't judge the propriety about the removable medium, cannot be used for the direct export service as it is.

In the conventional video image download service, it is enough that the propriety judgment for the download of the video image content is performed only once at the time of a purchase processing of the video image content because the purchase processing of the video image content and a download processing are performed continuously. On the other hand, in the direct export service, the purchase processing of the video image content and the export processing are not always performed continuously. This is because the export processing may be performed two or more times with respect to one purchase of the video image content. Therefore, in the direct export service, judgments of the propriety for the export processing are necessary at the time of the purchase processing of the video image content and at the time of the export processing, respectively.

Here, it is to be remarked that the standards of the propriety judgment for each processing do not necessarily agree with each other. For example, the case where the video image receiving terminal can use the direct export service and the removable medium cannot be used for the direct export service is described. When the direct export processing is performed, subsequent export processing must not be performed because the removable medium cannot be used for the direct export. On the other hand, when the video image content is purchased, if such a measure to exchange the removable medium before the subsequent export processing starts is taken, the execution of the direct export can be performed. In such a case, it is considered that, after displaying a warning message at the time of the purchase of the video image content, the purchase processing of the video image content is allowed to be performed.

In view of the above-mentioned conventional problems, an object of the present invention is to provide a receiving terminal, a content exporting method and the like, which can judge the propriety of the receiving terminal and the propriety of the removable medium on which a content will be recorded, for the direct export for the content.

SUMMARY OF THE INVENTION

The $1^{st}$ aspect of the present invention is a receiving terminal which receives a content from a content server providing a content download service and performs a direct export processing by which the content can be exported directly to a removable medium, the receiving terminal comprising:

a data acquiring unit which acquires from the content server information that is required for the export of the content and that includes information about a capability required for the receiving terminal and information about a capability required for the removable medium;

a propriety judgment unit which compares the information about the capability required for the receiving terminal with information about a capability the receiving terminal possesses, compares the information about the capability required for the removable medium with information about a capability the removable medium possesses, and judges whether the direct export processing of the content can be performed or not; and a control unit which makes a processing relevant to a purchase of the content or to the export of the content perform, according to a judgment result by the propriety judgment unit.

The $2^{nd}$ aspect of the present invention is the receiving terminal according to the $1^{st}$ aspect of the present invention, wherein the judgment of whether the direct export processing can be performed, is performed at a time of the purchase of the content and at a time of the export of the content.

The $3^{rd}$ aspect of the present invention is the receiving terminal according to the $1^{st}$ aspect of the present invention, wherein the propriety judgment unit judges, at the judgment of whether the direct export processing can be performed, that (i) the direct export processing is possible, (ii) the direct export processing is impossible but a restoration is possible, or (iii) the direct export processing is impossible and the restoration is impossible;

at a time of the purchase of the content, the control unit (i) controls a display unit to display a purchase screen when it is judged that the direct export processing is possible, (ii) controls the display unit to display that the direct export processing is impossible and to display the purchase screen when it is judged that the direct export processing is impossible but the restoration is possible, and (iii) controls the display unit to display that the direct export processing is impossible and to not display the purchase screen when it is judged that the direct export processing is impossible and the restoration is impossible; and at a time of the export of the content, the control unit (i) controls the display unit to display a screen for directing an execution of the export when it is judged that the direct export processing is possible, and (ii) controls the display unit to display that the direct export processing is impossible and to not display the screen for directing execution of the export when it is judged that the direct export processing is impossible but the restoration is possible or when it is judged that the direct export processing is impossible and the restoration is impossible.

The 4th aspect of the present invention is the receiving terminal according to the 3rd aspect of the present invention, wherein it is judged that the direct export processing is impossible but the restoration is possible, when the removable medium does not have enough capacity, or when the removable medium is not inserted to the receiving terminal, or when the removable medium is not applicable for the direct export processing; and it is judged that the direct export processing is impossible and the restoration is impossible, when the receiving terminal is not applicable for the direct export processing, or when the receiving terminal has broken down.

The 5th aspect of the present invention is the receiving terminal according to the 3rd aspect of the present invention, wherein the purchase screen and the screen for directing the execution of the export are screens sent from the content server which receives the judgment result of the propriety judgment unit, from the receiving terminal.

The 6th aspect of the present invention is the receiving terminal according to the 1st aspect of the present invention, further comprising a screen display unit which displays a screen for enabling a user to select a removable medium to which the content is exported, from plural removable media, wherein the propriety judgment unit includes a terminal capacity grasp unit which acquires the information about the capability the receiving terminal possesses and a media capacity grasp unit which acquires the information about the capability the removable medium selected by the user, possesses, and judges whether the direct export processing can be performed by using results acquired by the terminal capacity grasp unit and the media capacity grasp unit.

The 7th aspect of the present invention is the receiving terminal according to the 1st aspect of the present invention, wherein the information about the capability required for the removable medium includes at least one of a size of the content, a reproduction time of the content and a bit rate of the content; and the information about the capability required for the receiving terminal includes information indicating whether or not the content can be used for the export.

The 8th aspect of the present invention is the receiving terminal according to the 1st aspect of the present invention, wherein the information about the capability required for the removable medium includes a condition for resizing.

The 9th aspect of the present invention is the receiving terminal according to the 8th aspect of the present invention, wherein at a time of the purchase of the content, when the control unit judges that the direct export processing is possible or the direct export processing is impossible but a restoration is possible and the content is unrecordable on the removable medium if resizing is not executed, the control unit controls a display unit to display a screen which asks a user whether the user accepts the resizing or not, and controls the display unit to not display the purchase screen when the user does not accept the resizing.

The 10th aspect of the present invention is a content exporting method in a receiving terminal which receives a content from a content server providing a content download service and performs a direct export processing by which the content can be exported directly to a removable medium, the content exporting method comprising:

a first judgment step of, by the receiving terminal at a time of a purchase of the content, acquiring information which is required for the export of the content, comparing the acquired information with information about a capability the receiving terminal possesses and information about a capability the removable medium possesses, and judging, about whether the direct export processing of the content can be performed, that (i) the direct export processing is possible, (ii) the direct export processing is impossible but a restoration is possible, or (iii) the direct export processing is impossible and the restoration is impossible;

a first display step of (i) displaying a purchase screen when it is judged that the direct export processing is possible in the first judgment step, (ii) displaying that the direct export processing is impossible and displaying the purchase screen when it is judged that the export processing is impossible but the restoration is possible in the first judgment step, or (iii) displaying that the direct export processing is impossible and not displaying the purchase screen when it is judged that the direct export processing is impossible and the restoration is impossible in the first judgment step;

a purchase decision step of deciding a purchase processing when a user inputs to decide the purchase of the content in the purchase screen through an operation screen;

a second judgment step of, by the receiving terminal at the time of an export execution of the content, acquiring information which is required for the export or new information which is required for the export, comparing the acquired information with the information about the capability the receiving terminal possesses and the information about the capability the removable medium possesses, and judging whether the direct export processing can be performed or not;

a second display step of (i) displaying a screen for directing an execution of the export when it is judged that the direct export processing is possible in the second judgment step, and (ii) displaying that the export processing is impossible and not displaying the screen for directing execution of the export when it is judged that the direct export processing is impossible but the restoration is possible or when it is judged that the direct export processing is impossible and the restoration is impossible; and an export execution step of executing the export when the user directs to execute the export in the screen for directing execution of the export through the operation screen.

The 11th aspect of the present invention is a non-transitory computer-readable medium having a program stored thereon, wherein the program causes a computer to execute the content exporting method according to the 10th aspect of the present invention.

The present invention can provide a receiving terminal, a content exporting method and the like, which can judge the propriety of the receiving terminal and the propriety of the removable medium on which a content will be recorded, for the direct export for the content.

BRIEF DESCRIPTION OF THE DRAWINGS

FIG. 4(A) is a diagram showing an example of a display of a menu screen for a video image content download service according to the first embodiment of the present invention;

FIG. 4(B) is a diagram showing an example of a display of a list screen of contents to be provided according to the first embodiment of the present invention;

FIG. 4(C) is a diagram showing an example of a display of a screen to display detail information for the video image content according to the first embodiment of the present invention;

FIG. 4(D) is a diagram showing an example of a display of a screen to display a judgment result and a judgment reason at the time of the purchase of the video image content, according to the first embodiment of the present invention;

FIG. 4(E) is a diagram showing an example of a display of a screen to enable the change to a purchase screen according to the first embodiment of the present invention;

FIG. 14(A) is a diagram to describe an outline of a processing for a video image content on a conventional video image download service; and FIG. 14(B) is a diagram to describe an outline of a processing for the video image content on a direct export service.

DESCRIPTION OF SYMBOLS

Figure 1:
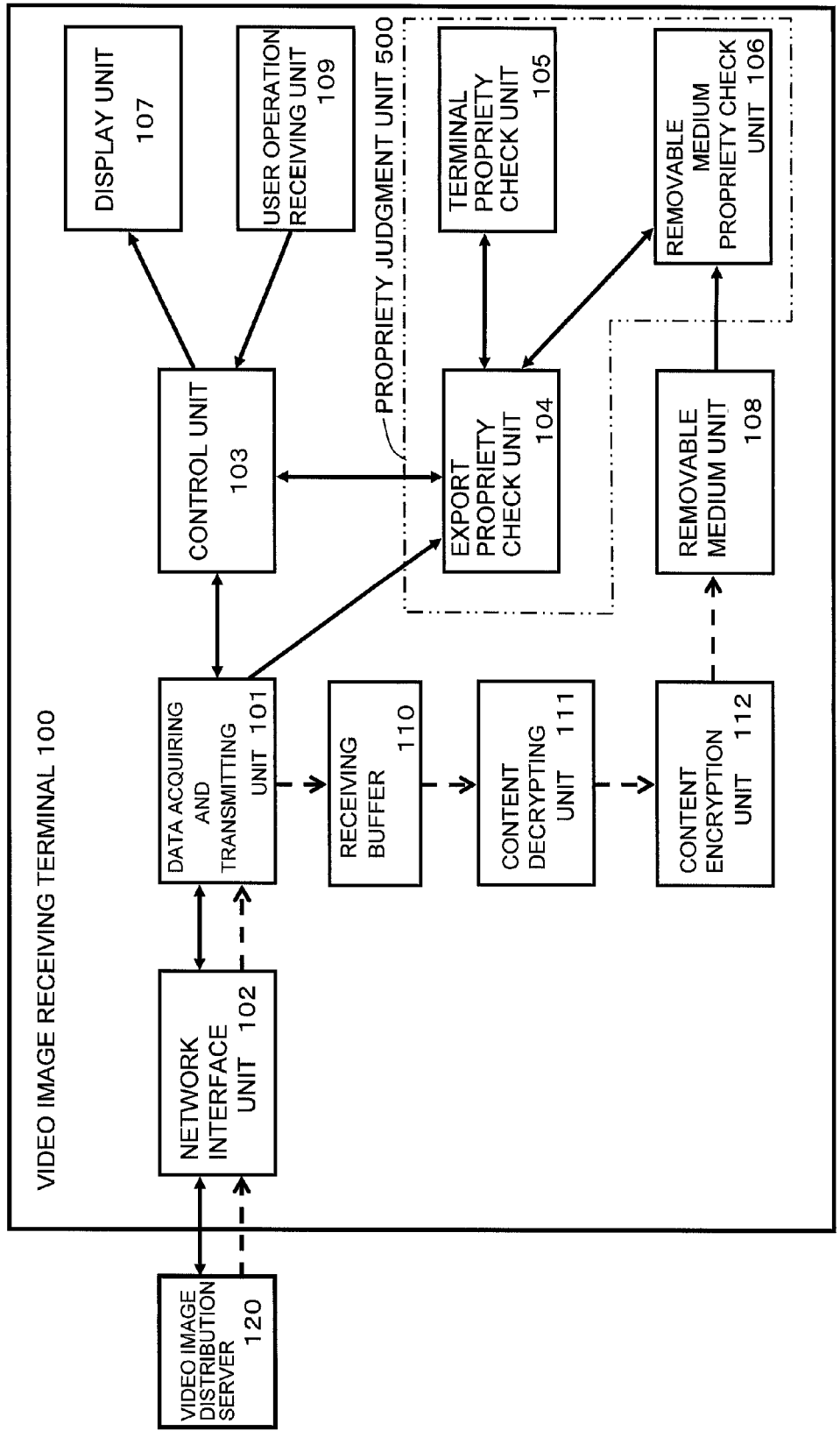
FIG. 1 is a block diagram showing a configuration of a video image receiving terminal according to a first embodiment of the present invention.

100 Video image receiving terminal
101 Data acquiring and transmitting unit
102 Network interface unit
103 Control unit
104 Export propriety check unit
105 Terminal propriety check unit
106 Removable medium propriety check unit
107 Display unit
108 Removable medium unit
109 User operation receiving unit
110 Receiving buffer
111 Content decrypting unit
112 Content encryption unit
120 Video image distribution server
130 Video image receiving terminal
131 Control unit
132 Export propriety check unit
133 Removable medium propriety check unit
150 Content purchasing screen select button
151 Purchased content screen select button
152 Offering content item
153 Offering content item
154 Offering content item
155 Content detail display
156 Medium selecting display
157 Purchase procedure screen select button
158 Judgment result display
159 Card number input area
160 Card number input determination button
161 Content purchase execution button
162 Purchase completion display
165 User acceptance check display
170 Purchased content item
171 Purchased content item
172 Purchased content item
173 Pulldown button for selecting medium
174 Judgment result display 175 Export execution button
176 Export processing reception display
200 Video image receiving terminal
201 HDD
202 Display
203 Removable medium
205 Video image receiving terminal
206 Buffer
210 Video image distribution server
300 Offering content display instruction
301 Offering content display instruction
302 Offering content list screen generation
303 Offering content list screen
304 Offering content list display
305 Selection of content to purchase
306 Content detail screen request
307 Content detail screen generation
308 Content detail screen
309 Content detail screen display
310 Export addressee medium selection
311 Export propriety check
312 Judgment result display
313 Purchase information input screen display
314 User information input
315 Input user information
316 Content purchase decision processing
317 Content acquisition information
318 Content purchase completion display
319 Judgment result display
320 End of content purchase processing
330 Video image content export screen display instruction
331 Purchased content screen request
332 Purchased content list screen generation
333 Purchased content list screen
334 Purchased content list display
335 Selection of content and medium
336 Export propriety check
337 Export execution button display
338 Export start instruction
339 Content download request
340 License check processing
341 Download of content data
342 Export processing execution
343 Judgment result display
344 End of export processing
350 Resizing acceptance check screen
351 Check result input of resizing acceptance
352 End of content purchase processing
400 Condition for export
410 Condition for export
500 Propriety judgment unit
501 Propriety judgment unit

PREFERRED EMBODIMENTS OF THE INVENTION

Embodiments to which the present invention is applied are described in detail below with reference to the drawings.

First Embodiment

FIG. 1(A) shows a block diagram showing a configuration of a video image receiving terminal according to a first embodiment of the present invention.

In FIG. 1(A), the video image receiving terminal 100 according to the first embodiment comprises a data acquiring and transmitting unit 101, a network interface unit 102, a control unit 103, an export propriety check unit 104, a terminal propriety check unit 105, a removable medium propriety check unit 106, a display unit 107, a removable medium unit 108, a user operation receiving unit 109, a receiving buffer 110, a content decrypting unit 111 and a content encryption unit 112. The video image receiving terminal 100 has a function of judging whether the export for the video image content selected by the user can be performed or not when a user selects a desired video image content, a purchase processing of the video image content is performed and an export for the video image content is performed.

The video image receiving terminal 100 is a video image receiving terminal having a function of receiving a video image content through a communication network in the direct export service provided by a communication enterprise or a video image distribution enterprise. As such a video image receiving terminal 100, a digital television, a set top box, a personal computer or the like can be considered. But the video image receiving terminal 100 is not limited to any of these.

In FIG. 1, an arrow shown with a dashed line shows a flow of data of the video image content and an arrow shown with a solid line shows a flow of information other than the data of the video image content.

The network interface unit 102 is connected to a video image distribution server 120 provided by the communication enterprise or the video image distribution enterprise, through an external communication network.

The data acquiring and transmitting unit 101 receives an HTML content and the video image content, which are transmitted from the video image distribution server 120, through the network interface unit 102. And the data acquiring and transmitting unit 101 transmits the data directed by the control unit 103 to the video image distribution server 120 through the network interface unit 102.

The control unit 103 performs control of each operation in the video image receiving terminal 100.

The export propriety check unit 104 checks whether the video image receiving terminal 100 can export the video image content to the removable medium unit 108, by using information about the video image content included in the data transmitted from the video image distribution server 120.

The terminal propriety check unit 105 acquires the information about the video image content from the export propriety check unit 104, and checks whether the function of the video image receiving terminal 100 meets a condition for the export of the video image content.

The removable medium propriety check unit 106 acquires the information about the video image content from the export propriety check unit 104, and checks whether the function of the removable medium unit 108 meets the condition for the export of the video image content.

The display unit 107 displays the data which has been requested to be displayed by the control unit 103, and shows the data to the user.

The removable medium unit 108 is a medium for recording the video image content. As such a medium, a CD (Compact Disc), a DVD (Digital Versatile Disc), a BD (Blu-ray Disc (registered trademark)), an SD memory card (Secure Digital Memory Card), a Memory Stick or the like can be considered. But the medium is not limited to any of these. Generally, this removable medium unit 108 is of a portable type.

The user operation receiving unit 109 accepts a request to purchase a video image content or a request to export a video image content from the outside, for example, with an operation of a remote controller by the user. And the user operation receiving unit 109 transmits, to the control unit 103, the accepted request to purchase the video image content or the accepted request to export the video image content.

The content decrypting unit 111 receives the video image content, which has been downloaded from the video image distribution server 120, from the data acquiring and transmitting unit 101 through the receiving buffer 110. And the content decrypting unit 111 decrypts the received video image content.

The content encryption unit 112 encrypts, for exporting the data to the removable medium unit 108, the data of the video image content decrypted by the content decrypting unit 111. And the content encryption unit 112 writes the encrypted data of the video image content to the removable medium unit 108.

The receiving buffer 110 is a buffer which records a necessary quantity of the data temporarily in order to make the content decrypting unit 111 and the content encryption unit 112 process the data of the video image content under download. A RAM or the like is used as the receiving buffer 110.

The video image receiving terminal 100 corresponds to an example of a receiving terminal according to the present invention. The video image distribution server 120 corresponds to an example of a content server according to the present invention. The video image content used in the first embodiment corresponds to an example of a content according to the present invention. The data acquiring and transmitting unit 101 corresponds to an example of a data acquiring unit according to the present invention. The display unit 107 corresponds to an example of a screen display unit according to the present invention. A construction of a propriety judgment unit 500 which includes the export propriety check unit 104, the terminal propriety check unit 105 and the removable medium propriety check unit 106, surrounded with a two-dot chain line in FIG. 1, corresponds to an example of a propriety judgment unit according to the present invention. The terminal propriety check unit 105 corresponds to an example of a terminal capacity grasp unit according to the present invention. The removable medium propriety check unit 106 corresponds to an example of a media capacity grasp unit according to the present invention.

A process which judges whether the export can be performed in the video image receiving terminal 100 at the time of the purchase of the video image content and a process which judges whether the export can be performed in the video image receiving terminal 100 at the time of the export of the video image content are described below.

First, the process which judges whether the export can be performed in the video image receiving terminal 100 at the time of the purchase of the video image content is described using FIGS. 1 to 5.

Figure 2:
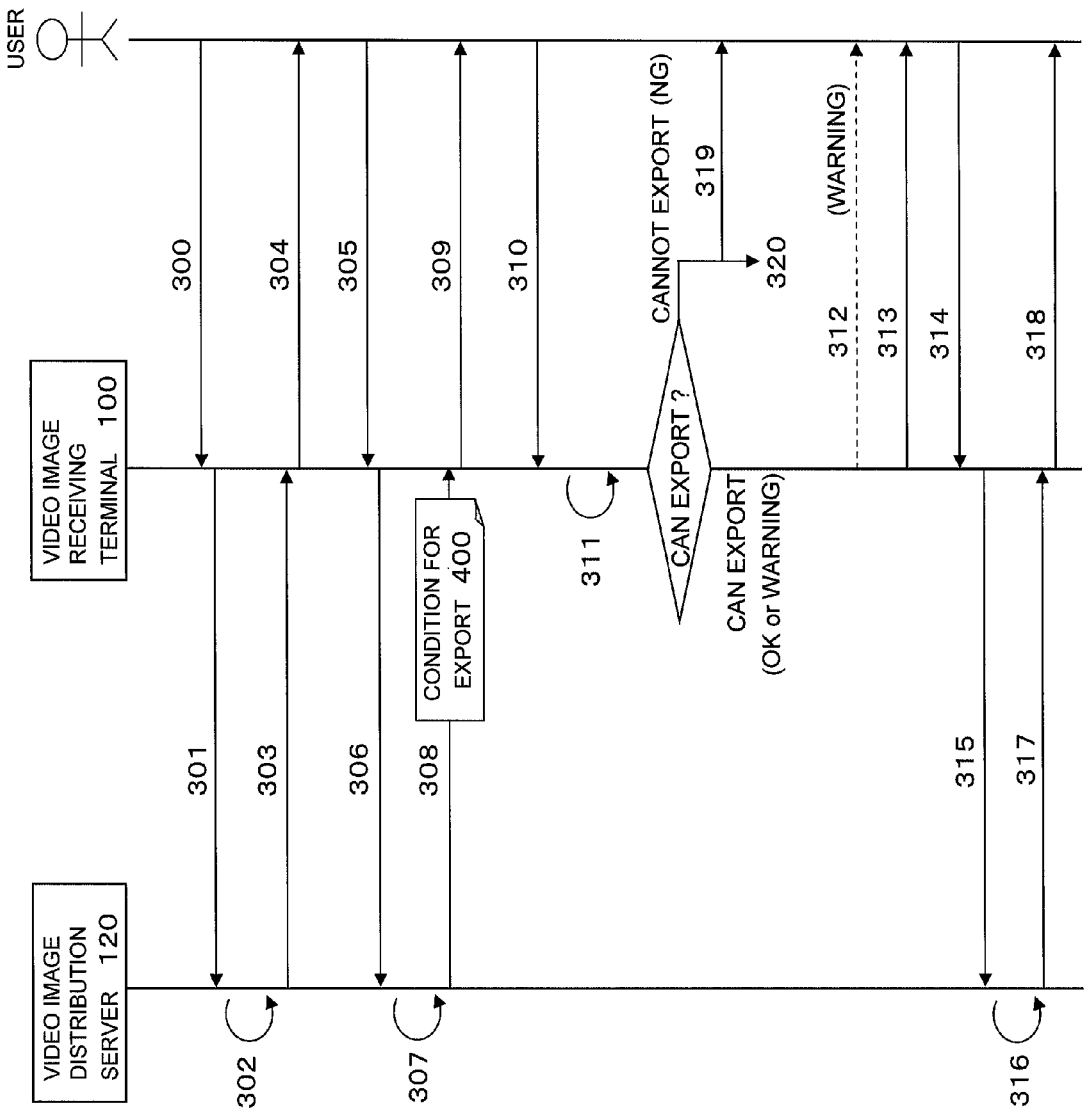
FIG. 2 is a diagram showing an operation and a communication sequence, in the video image receiving terminal and a video image distribution server at the time of a purchase of a video image content, according to the first embodiment of the present invention.
Figure 3:
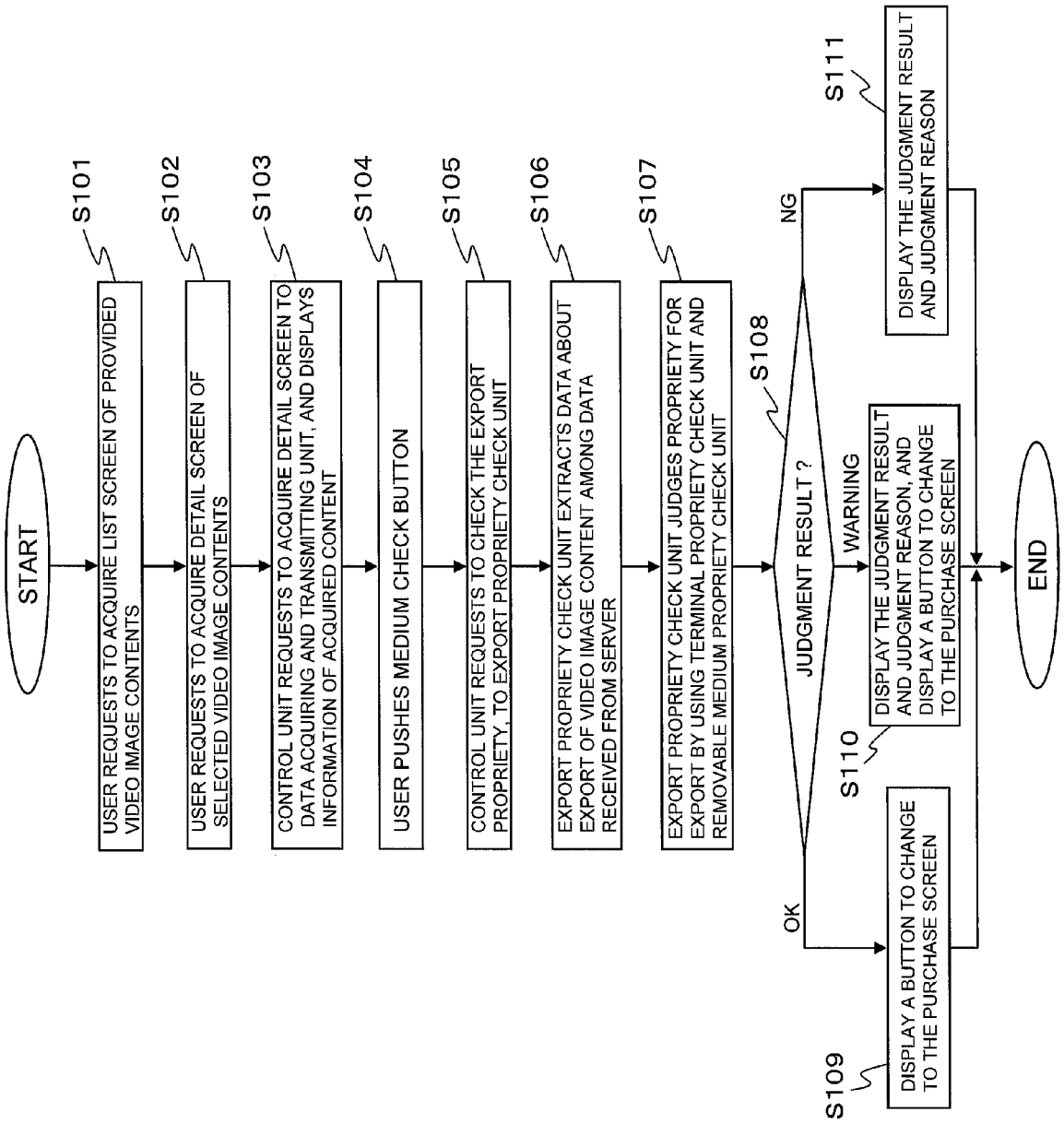
FIG. 3 is a flowchart showing a process which judges whether the export processing for the video image content can be performed in the video image receiving terminal at the time of the purchase of the video image content, according to the first embodiment of the present invention.

FIG. 2 shows an operation and a communication sequence, in the video image receiving terminal 100 and the video image distribution server 120 at the time of the purchase of the video image content. FIG. 3 is a flowchart showing a process which judges whether the export can be performed in the video image receiving terminal 100 at the time of the purchase of the video image content. FIGS. 4(A) to 4(E) and FIGS. 5(A) to 5(C) show examples of screen displays displayed by the display unit 107 at the time of the purchase of the video image content, respectively.

FIG. 4(A) is an example of a display of a menu screen for the video image content download service. HTML data is received from the video image distribution server 120, for example, with an operation of the remote controller by the user. The control unit 103 displays this screen by the display unit 107, according to the HTML data.

In the menu screen shown in FIG. 4(A), a content purchasing screen select button 150 and a purchased content screen select button 151 are displayed. When the user selects the content purchasing screen select button 150, a screen (not shown) for search for selecting the video image content which the user wants to purchase is displayed.

FIG. 4(B) is an example of a display of a list screen of contents to be provided, which have been searched for when the user inputted a keyword for search or the like in the screen for selecting the video image content.

When the search is ordered by inputting the search keyword in the screen for selecting the video image content in order to search the video image content to purchase, the user operation receiving unit 109 receives the order for search (an offering content display instruction 300) from the user and transmits the order for search to the control unit 103. The control unit 103 transmits an offering content display instruction 301 to the video image content server 120 by the data acquiring and transmitting unit 101 (step S101).

When the video image content server 120 receives the offering content display instruction 301, the video image content server 120 extracts the video image content corresponding to the search keyword inputted by the user and generates a list screen 302 of the extracted video image contents. And the video image content server 120 transmits the generated offering content list screen 303 to the video image receiving terminal 100. When the control unit 103 of the video image receiving terminal 100 receives the offering content list screen 303 from the data acquiring and transmitting unit 101, the control unit 103 displays the list screen of the contents to be provided as shown in FIG. 4(B), by the display unit 107.

In the example of the display of FIG. 4(B), there are three video image contents searched for by the user's order for search, and the offering content items 152 to 154 showing titles of the three video image contents are displayed.

FIG. 4(C) shows an example of a display of a screen to display detail information for the video image content to be purchased by the user.

When the user selects an item of the title of the video image content to purchase in the offering content list screen of FIG. 4(B), the detail information about the video image content is displayed as shown in FIG. 4(C).

Here, the case where the user selects the offering content item 152 in the screen of FIG. 4(B) is described. The user operation receiving unit 109 in the video image receiving terminal 100 receives selection information 305 of content to purchase from the user, and transmits the received selection information 305 of content to purchase, to the control unit 103 (step S102). The control unit 103 transmits a content detail screen request to the data acquiring and transmitting unit 101. The data acquiring and transmitting unit 101 transmits the content detail screen request 306 to the video image distribution server 120 through the network interface unit 102.

When the video image distribution server 120 receives the content detail screen request 306, the video image distribution server 120 generates a content detail screen 307 which includes the content detail information according to the offering content item 152 selected by the user. And the video image distribution server 120 transmits the generated content detail screen 308 to the video image receiving terminal 100.

When the video image distribution server 120 transmits the content detail screen 308 to the video image receiving terminal 100, the video image distribution server 120 includes a condition 400 for export, which is data about the export, into data of the content detail screen 308 and transmits the content detail screen 308. As the data of the content detail screen 308 transmitted by the video image distribution server 120, HTML, XML or the like can be considered. As the condition 400 for export, a size of the video image content, a reproduction time of the video image content, a bit rate of the video image content or the like can be considered. But the data of the content detail screen 308 and the condition 400 for export are not limited to any of these.

The data acquiring and transmitting unit 101 of the video image receiving terminal 100 acquires the content detail screen 308 from the video image distribution server 120 through the network interface unit 102 and transmits the content detail screen 308 to the control unit 103. The control unit 103, which has received the content detail screen 308, transfers it to the display unit 107. The display unit 107, which has acquired the content detail screen, displays the content detail screen 309 as shown in FIG. 4(C) (step S103).

A medium selecting display 156 and a purchase procedure screen select button 157 are displayed on the content detail screen along with a content detail display 155 about the content to be purchased by the user as shown in FIG. 4(C). The purchase procedure screen select button 157 is in the state where it cannot be selected, because the judgment of the propriety for the export is not performed yet.

A list of removable discs, in which data can be written, in the video image receiving terminal 100 is displayed on the medium selecting display 156. In the example of FIG. 4(C), any of a BD, a DVD and an SD card can be selected as the removable disc for recording the data to export. The video image distribution server 120 receives in advance such information about the removable disc, in which data can be written, from the video image receiving terminal 100. And, when the video image distribution server 120 generates the content detail screen 307, the video image distribution server 120 generates the content detail screen including the medium selecting display 156.

The user selects the BD from the removable media shown in the medium selecting display 156 in FIG. 4(C), and pushes a button corresponding to it. The user operation receiving unit 109 receives an export addressee medium selection 310 from the user, and transmits the received export addressee medium selection 310 to the control unit 103 (step S104).

The control unit 103, which has received the export addressee medium selection 310, transmits an export propriety check request to the export propriety check unit 104 and makes the export propriety check unit 104 check the propriety for the export 311 (step S105).

The export propriety check unit 104, which has received the export propriety check request, acquires data of the content detail screen from the data acquiring and transmitting unit 101 and extracts the condition 400 for export included in the data (step S106).

The export propriety check unit 104, which has extracted the condition 400 for export, transmits, to the terminal propriety check unit 105, data that is required for the terminal propriety check unit 105, and the export propriety check unit 104 also transmits, to the removable medium propriety check unit 106, data that is required for the removable medium propriety check unit 106. And the export propriety check unit 104 requests export propriety checks of the terminal propriety check unit 105 and the removable medium propriety check unit 106, respectively.

The terminal propriety check unit 105 compares the data transmitted from the export propriety check unit 104 with the capability the video image receiving terminal 100 possesses, and the terminal propriety check unit 105 checks the propriety about the video image receiving terminal 100. The removable medium propriety check unit 106 compares the data transmitted from the export propriety check unit 104 with the capability the removable medium unit 108 selected by the user at step S104 possesses, and the removable medium propriety check unit 106 checks the propriety about the removable medium unit 108. The terminal propriety check unit 105 and the removable medium propriety check unit 106 transmit respective check results to the export propriety check unit 104. The export propriety check unit 104, which has received the check results, judges whether the export can be performed or not (step S107).

The condition 400 for export corresponds to an example of information that is required for the export of the content according to the present invention. Data that is required for the terminal propriety check unit 105 corresponds to an example of information about a capability required for the receiving terminal according to the present invention. Data that is required for the removable medium propriety check unit 106 corresponds to an example of information about a capability required for the removable medium according to the present invention.

For example, data required for the terminal propriety check unit 105, which is extracted from the condition 400 for export by the export propriety check unit 104 and is transmitted to the terminal propriety check unit 105 is information showing whether the video image content can be used for the direct export or not.

For example, data required for the removable medium propriety check unit 106, which is extracted from the condition 400 for export by the export propriety check unit 104 and is transmitted to the removable medium propriety check unit 106, is the size of the video image content, the reproduction time of the video image content or the bit rate of the video image content.

For example, the removable medium propriety check unit 106 judges whether the content can be recorded or not on the removable medium unit 108, by comparing the size recordable on the removable medium unit 108 with the size of the video image content. Even when the size of the video image content is too large and cannot be recorded on the removable medium unit 108 with the downloading form, it may become recordable by compressing the size. In such a case, the data size of the video image content after compression can be calculated by using the reproduction time. When the bit rate at the time of readout is different according to the kind of the removable medium 108 and the bit rate of the video image content exceeds the bit rate at the time of readout of the removable medium unit 108, the video image content cannot be reproduced normally when read from the removable medium 108. In such a case, the removable medium propriety check unit 106 judges that the export cannot be performed.

The export propriety check unit 104 transmits the judgment result to the control unit 103. The control unit 103, which has received the judgment result, changes the display request for the display unit 107 according to the judgment result (step S108). The rule of the change of a display according to the judgment result may be contained in the data of the content detail screen 308 received from the video image distribution server 120, but this is not restrictive and is merely an example.

When it is recognized that there is no problem (the case of "OK") as a result of the judgment in step S108, the control unit 103 requests the display unit 107 to display a button to direct changing to a purchase screen on the screen (step S109).

FIG. 4(E) shows an example of a display of a screen to enable the change to the purchase screen.

The display unit 107 changes the state of the purchase procedure screen select button 157, which is not selectable in FIG. 4(C), into the state where the purchase procedure screen select button 157 can be selected as shown in FIG. 4(E).

When it is recognized that a problem which can be restored is occurring (the case of "WARNING") as a result of the judgment in step S108, the control unit 103 requests the display unit 107 to display the judgment result and the judgment reason on the screen. Specific examples of such a case where the problem which can be restored is occurring are as follows: (i) the removable medium unit 108 does not have enough capacity, (ii) the removable medium unit 108 is not inserted, and (iii) the inserted removable medium unit 108 is not applicable for the direct export but the export can be performed by changing the inserted removable medium unit 108.

FIG. 4(D) shows an example of a display of a screen to display the judgment result and the judgment reason on the screen.

In this case, for example, the display unit 107 carries out the view 312 as popup of the judgment result and the judgment reason on the screen like a judgment result display 158 in FIG. 4(D).

When the user checks the judgment result display 158 in FIG. 4(D), the control unit 103 requests the display unit 107 to display the button to direct changing to the purchase screen on the screen even if the judgment result is WARNING. When the display unit 107 receives the request to display the button to direct changing to the purchase screen, the display unit 107 erases the judgment result display 158 and displays the screen including the purchase procedure screen select button 157 which can be selected as shown in FIG. 4(E) (step S110).

When it is recognized that a problem which cannot be restored is occurring (the case of "NG") as a result of the judgment in step S108, the control unit 103 requests the display unit 107 to display the judgment result and the judgment reason on the screen (step S111). Specific examples of such a case where the problem which cannot be restored is occurring are as follows: (i) the video image receiving terminal 100 is not applicable for the direct export service, and (ii) the video image receiving terminal 100 has broken down and cannot execute the direct export processing. The display unit 107 carries out the view 319 as popup of the judgment result and the judgment reason on the screen like the judgment result display 158 in FIG. 4(D).

In this case, even when the user checks the judgment result display 158, the control unit 103 does not allow the purchase procedure screen select button 157 to be selectable and ends the content purchase processing 320.

The judgment processing in step S108 corresponds to an example of a first judgment step according to the present invention. The display processing in steps S109 to S111 corresponds to an example of a first display step according to the present invention.

FIG. 5(A) shows an example of a display of a screen for making user information required for purchase input. FIG. 5(B) shows an example of a display of a screen to direct an execution for purchasing the content. FIG. 5(C) shows an example of a display of a screen to show completion of the content purchase.

When the user pushes the purchase procedure screen select button 157 in the display of FIG. 4(E) displayed in step S109 or step S110, the control unit 103 displays a purchase information input screen 313 as shown in FIG. 5(A) by the display unit 107.

In the purchase information input screen in FIG. 5(A), when the user inputs the number of a credit card 314 to a card number input area 159 and pushes a card number input determination button 160, the control unit 103 displays a content purchase execution button 161 to direct the execution for purchasing the video image content as shown in FIG. 5(B) by the display unit 107.

When the user pushes the content purchase execution button 161 in FIG. 5(B), the control unit 103 transmits information on the number of the credit card, which has been inputted by the user, as input user information 315 to the video image distribution server 120 by the data acquiring and transmitting unit 101.

When the video image distribution server 120 receives the input user information 315, the video image distribution server 120 performs a content purchase decision processing 316 such as reference to the number of the credit card. When the content purchase decision processing 316 is finished normally, the video image distribution server 120 transmits content acquisition information 317 such as URL for downloading the video image content to the video image receiving terminal 100.

When the control unit 103 of the video image receiving terminal 100 receives the content acquisition information 317 from the data acquiring and transmitting unit 101, the control unit 103 displays a purchase completion display 162 on the screen as shown in FIG. 5(C) by the display unit 107 and notifies the user of the normal completion of the purchase processing for the video image content.

The processing up to the purchase completion display 162 in FIG. 5(C) after the user's push of the purchase procedure screen select button 157 in the screen of FIG. 4(E) corresponds to an example of a purchase decision step according to the present invention.

In the above, the content purchase decision processing is performed by judging the export propriety about only one removable medium (corresponding to the BD in the above) selected by the user from among the removable media which can be used in the video image receiving terminal 100. Alternatively, the content purchase decision processing can be performed after judgment of the export propriety about each of the two or more removable media which are selected by the user.

The license purchase of the video image content may not be the purchase of the license for performing only one export processing. The license for performing two or more export processings is purchased in many cases. Even when the license for performing two or more export processings is purchased, the export license for the two or more export processings is purchased by the above-mentioned one purchase processing of the video image content.

The number of times of the export permitted to be performed with the license to be purchased is determined by allowing the user to specify the number of times of the export when the list of contents to be provided is displayed as shown in FIG. 4(B) or when the user information for purchase is inputted as shown in FIG. 5(A) or FIG. 5(B). A provider of the video image contents may sell a license such that a predetermined number of times of the export for each of the video image contents is set beforehand.

On the direct export service, two or more export processings can be performed with one purchase processing. Therefore, the export processing for the video image content is performed separately from the purchase processing mentioned above.

The process which judges whether the export can be performed in the video image receiving terminal 100 at the time of the export of the video image content is described using FIG. 1, and FIGS. 6 to 8.

Figure 6:
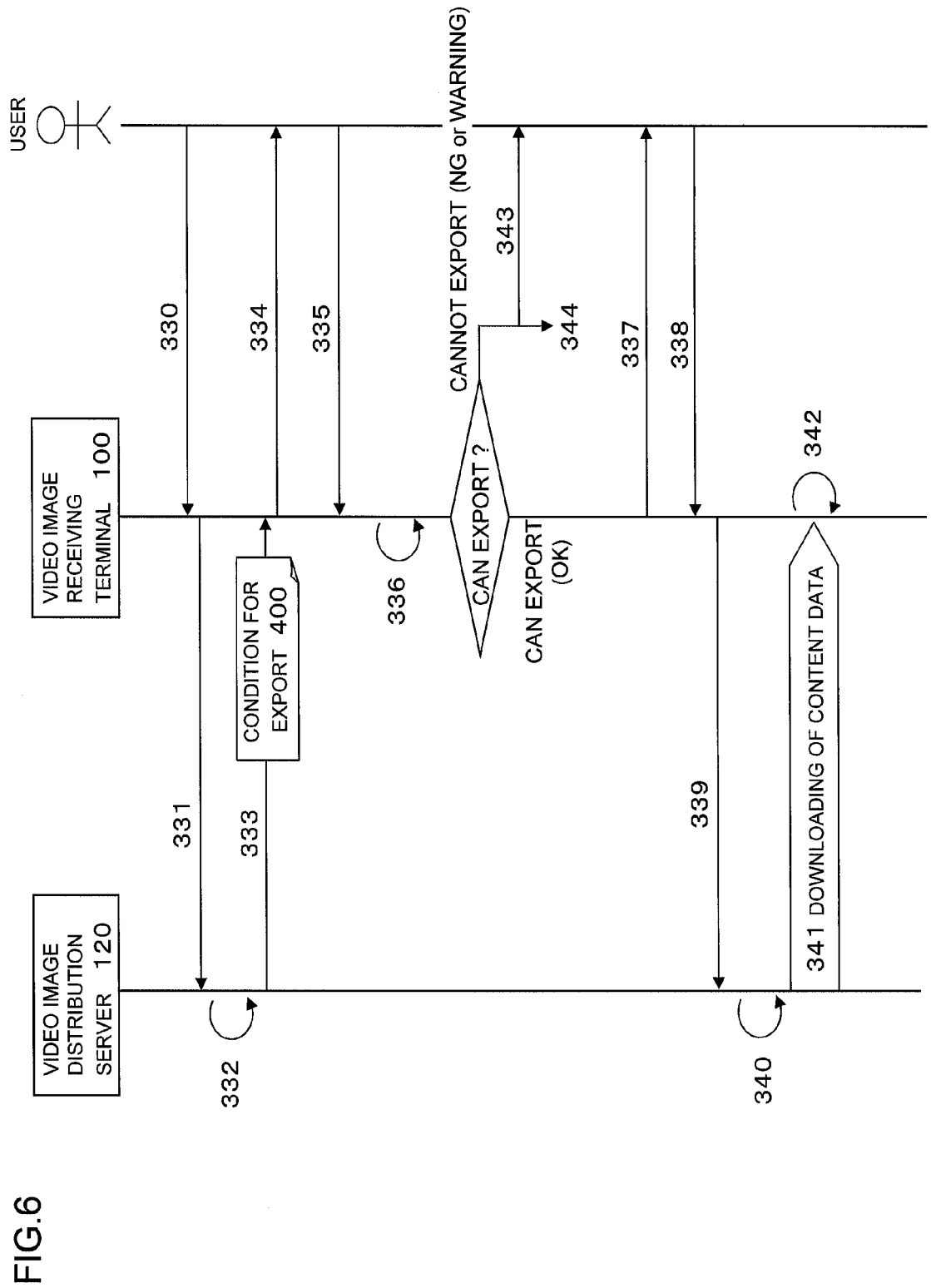
FIG. 6 is a diagram showing an operation and a communication sequence, of the video image receiving terminal and the video image distribution server at the time of the export of the video image content, according to the first embodiment of the present invention.
Figure 7:
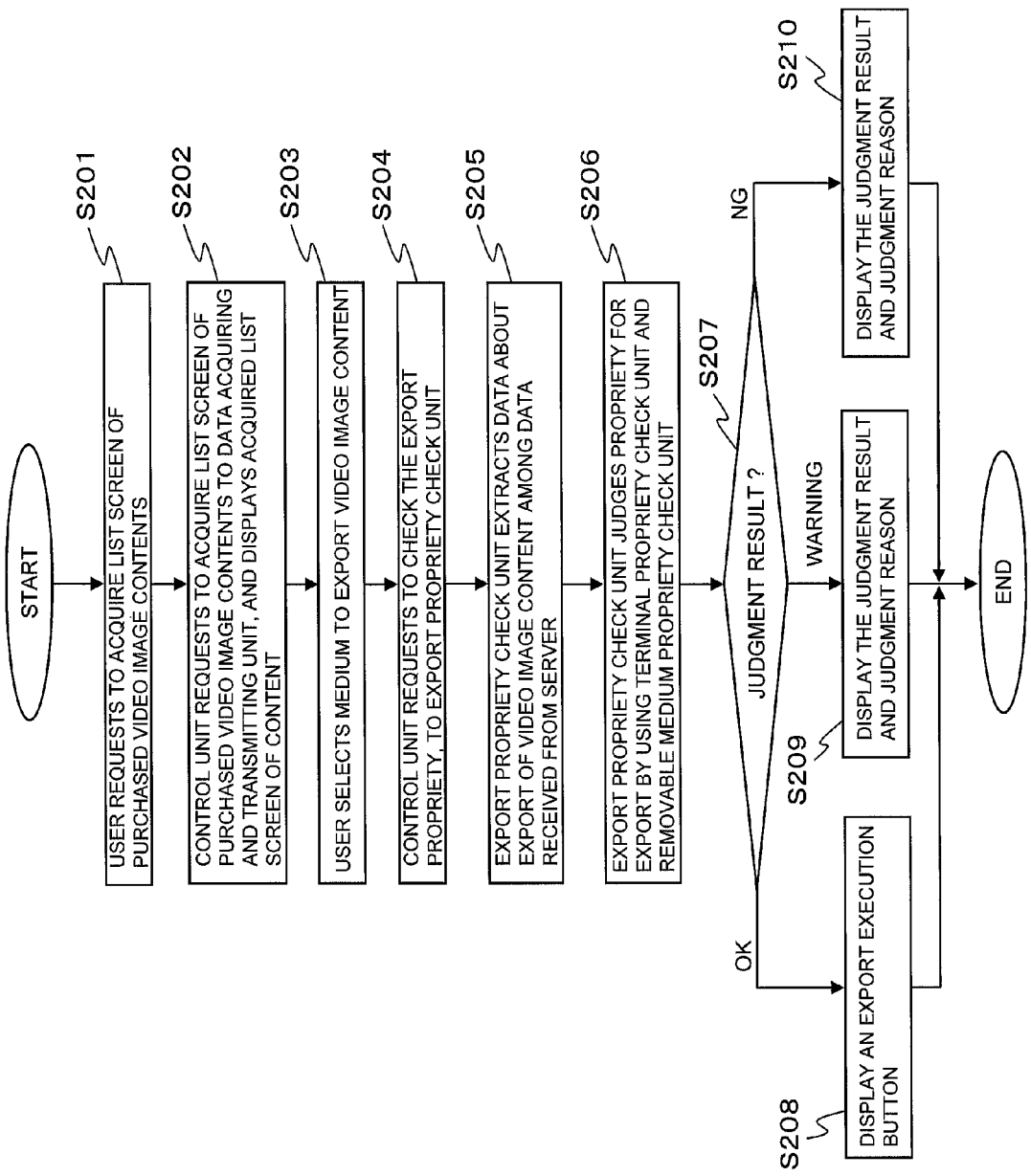
FIG. 7 is a flowchart showing a process which judges whether the export processing for the video image content can be performed in the video image receiving terminal at the time of the export of the video image content, according to the first embodiment of the present invention.

FIG. 6 shows an operation and a communication sequence, of the video image receiving terminal 100 and the video image distribution server 120 at the time of the export of the video image content. FIG. 7 is a flowchart showing the process which judges whether the export processing for the video image content can be performed in the video image receiving terminal 100 at the time of the export of the video image content. FIGS. 8(A) to 8(F) show examples of displays of the screen displayed by the display unit 107 at the time of the export of the video image content.

The user pushes the purchased content screen select button 151 in the menu screen in FIG. 4(A) in order to export the video image content the license of which has been purchased.

When the purchased content screen select button 151 is pushed, the user operation receiving unit 109 of the video image receiving terminal 100 receives a video image content export screen display instruction 330 from the user, and the user operation receiving unit 109 transmits the received video image content export screen display instruction 330 to the control unit 103 (step S201). The control unit 103 transmits a purchased content screen request to the data acquiring and transmitting unit 101. The data acquiring and transmitting unit 101 transmits the purchased content screen request 331 to the video image distribution server 120 through the network interface unit 102.

When the video image distribution server 120 receives the purchased content screen request 331, the video image distribution server 120 generates a list screen 332 of the video image content which has been purchased by the user. And the video image distribution server 120 transmits the generated purchased content list screen 333 to the video image receiving terminal 100.

When the video image distribution server 120 transmits the purchased content list screen 333 to the video image receiving terminal 100, the video image distribution server 120 includes the condition 400 for export into data of the purchased content list screen 333 and transmits the purchased content list screen 333.

The data acquiring and transmitting unit 101 of the video image receiving terminal 100 acquires the purchased content list screen 333 from the video image distribution server 120 through the network interface unit 102 and transmits the purchased content list screen 333 to the control unit 103. The control unit 103, which has received the purchased content list screen 333, transfers it to the display unit 107. The display unit 107, which has acquired the purchased content list screen, displays the purchased content list display 334 (step S202).

FIG. 8(A) is an example of a display of the screen showing the list of the purchased contents displayed at this time.

In the example of the display of FIG. 8(A), there are three video image contents the licenses of which have been purchased by the user, and the purchased content items 170 to 172 showing information of the three video image contents are displayed. The number of times of the export permitted to be performed for the video image content and the kind of the removable media for recording the content to export is displayed in respective purchased content items 170 to 172. The example of the display of FIG. 8(A) shows, regarding the purchased content item 172, that the export of the number of times for the purchased license has been already performed and that further export processing cannot be performed.

FIG. 8(B) shows an example of a display of the screen to select the kind of a removable medium for recording the content to export.

In respective purchased content items 170 to 172, a pulldown button 173 for selecting medium to select the kind of a removable medium is displayed. When the user pushes the pulldown button 173 for selecting medium, a pulldown menu for selecting the removable medium which can be used with the video image receiving terminal 100 is displayed as shown in FIG. 8(B). And the user can select the removable medium for recording the content to export.

In the screen of the list of the purchased contents of FIG. 8(A), when the user selects the removable medium for export and directs the video image content to export, an export propriety check 336 is performed.

FIG. 8(C) shows an example of a display of the screen when the user selects the kind of the removable medium and the video image content to export. FIG. 8(C) shows the state where the user has directed that the video image content according to the purchased content item 170 be exported to BD.

In the screen of the list of the purchased contents of FIG. 8(A), the user selects the removable medium for recording the content to export and pushes the button of the purchased content item 170. The user operation receiving unit 109 receives a selection 335 of the content and medium and transmits the received selection 335 of the content and medium to the control unit 103 (step S203).

The control unit 103, which has received the selection 335 of the content and medium, transmits the export propriety check request to the export propriety check unit 104 and makes the export propriety check unit 104 check the propriety for the export 336 (step S204).

The export propriety check unit 104, which has received the export propriety check request, acquires data of the content detail screen from the data acquiring and transmitting unit 101 and extracts the condition 400 for export included in the data (step S205).

The export propriety check unit 104, which has extracted the condition 400 for export, transmits, to the terminal propriety check unit 105, data that is required for the terminal propriety check unit 105, and the export propriety check unit 104 also transmits, to the removable medium propriety check unit 106, data that is required for the removable medium propriety check unit 106. And the export propriety check unit 104 requests export propriety checks of the terminal propriety check unit 105 and the removable medium propriety check unit 106, respectively.

The terminal propriety check unit 105 compares the data transmitted from the export propriety check unit 104 with the capability the video image receiving terminal 100 possesses, and the terminal propriety check unit 105 checks the propriety about the video image receiving terminal 100. The removable medium propriety check unit 106 compares the data transmitted from the export propriety check unit 104 with the capability the removable medium unit 108 selected by the user at step S203 possesses, and the removable medium propriety check unit 106 checks the propriety about the removable medium unit 108. The terminal propriety check unit 105 and the removable medium propriety check unit 106 transmit respective check results to the export propriety check unit 104. The export propriety check unit 104, which has received the check results, judges whether the export can be performed or not (step S206).

The export propriety check unit 104 transmits the judgment result to the control unit 103. The control unit 103, which has received the judgment result, changes the display request for the display unit 107 according to the judgment result (step S207).

When it is recognized that there is no problem (the case of "OK") as a result of the judgment in step S207, the control unit 103 judges that the export processing can be performed and requests the display unit 107 to display a button to execute the export processing on the screen (step S208).

FIG. 8(E) shows an example of a display of the screen to display the button to execute the export processing. When the display unit 107 is requested to display the button to execute the export processing, the display unit 107 performs the display 337 of an export execution button 175 to start the export processing on the screen as shown in FIG. 8(E).

When it is recognized that a problem which can be restored is occurring (the case of "WARNING") as a result of the judgment in step S207, the control unit 103 judges that the export processing cannot be performed and requests the display unit 107 to display the judgment result and the judgment reason on the screen (step S209), which is unlike the processing at the time of the purchase of the video image content shown in FIG. 3. And the control unit 103 does not perform subsequent export processing. Specific examples of such a case where the problem which can be restored is occurring are as follows: (i) the removable medium unit 108 does not have enough capacity, (ii) the removable medium unit 108 is not inserted, and (iii) the inserted removable medium unit 108 is not applicable for the direct export but the export can be performed by changing the inserted removable medium unit 108.

The purpose of the user at the time of export execution of the video image content is to export the video image content to the removable medium unit 108. On the other hand, the purpose of the user at the time of the video image content purchase processing is to purchase a desired video image content. Therefore, the processing of step S209 differs from the processing of step S110 at the time of the video image content purchase processing. When a problem which can be restored is occurring (the case of "WARNING"), the purchase procedure can be performed without problems but an error certainly occurs at the time of the export execution if the export is performed.

FIG. 8(D) shows an example of a display of the screen to display the judgment result and the judgment reason on the screen.

In this case, for example, the display unit 107 carries out the view 343 as popup of the judgment result and the judgment reason on the screen like a judgment result display 174 in FIG. 8(D).

When the user checks the judgment result display 174 in FIG. 8(D), the control unit 103 erases the judgment result display 174 by the display unit 107 and ends the export processing 344.

When it is recognized that a problem which cannot be restored is occurring (the case of "NG") as a result of the judgment in step S207, the control unit 103 judges that the export processing cannot be performed and requests the display unit 107 to display the judgment result and the judgment reason on the screen (step S210). And the control unit 103 does not perform subsequent export processing. Specific examples of such a case where the problem which cannot be restored is occurring are as follows: (i) the video image receiving terminal 100 is not applicable for the direct export service, and (ii) the video image receiving terminal 100 has broken down and cannot execute the direct export processing. The display unit 107 carries out the view 343 as popup of the judgment result and the judgment reason on the screen like the judgment result display 174 in FIG. 8(D). When the user checks the judgment result display 174 in FIG. 8(D), the control unit 103 erases the judgment result display 174 by the display unit 107 and ends the export processing 344.

The judgment processing in step S207 corresponds to an example of a second judgment step according to the present invention. The display processing in steps S208 to S210 corresponds to an example of a second display step according to the present invention.

FIG. 8(F) shows an example of a display of the screen to display the acceptance of the export processing and the start of the export.

In the display of FIG. 8(E) displayed in step S208, when the user pushes the export execution button 175, the user operation receiving unit 109 receives an export start instruction 338 from the user and transmits the export start instruction 338 to the control unit 103. The control unit 103 transmits a content download request 339 of the video image content, which has been directed by the user, to the video image distribution server 120 by the data acquiring and transmitting unit 101. At this time, the control unit 103 requests the download for the URL contained in the content acquisition information 317 received from the video image distribution server 120 at the time of the content purchase.

When the video image distribution server 120 receives the content download request 339, the video image distribution server 120 performs a license check processing 340. When the video image distribution server 120 checks that the content download request 339 is transmitted from a video image receiving terminal having the effective license, the video image distribution server 120 performs the transmission 341 of the data of the requested video image content to the video image receiving terminal 100.

When the control unit 103 of the video image receiving terminal 100 checks that a download 341 of content data has been started by the data acquiring and transmitting unit 101 and that an export processing execution 342 has been started, the control unit 103 displays an export processing reception display 176 on the screen as shown in FIG. 8(F) by the display unit 107, accepts the export processing, and notifies the user that the export processing is under execution.

The processing up to the export processing reception display 176 in FIG. 8(F) after the user's push of the export execution button 175 in the screen of FIG. 8(E) corresponds to an example of a export execution step according to the present invention.

In the processing of step S209, after the export processing has been ended, the screen of FIG. 8(A) can be displayed again so that the processing of step S203 is repeated in which the user selects the video image content to export and the removable medium.

In the above, the video image distribution server 120 includes the condition 400 for export into data of the purchased content list screen 333 and transmits the data. However, the condition 400 for export acquired at the time of the video image content purchase processing can be recorded so that the export propriety check unit 104 uses the condition for export 400 recorded at step S205. In this case, the video image distribution server 120 does not need to include the condition 400 for export into the data of the purchased content list screen 333 when transmitting the purchased content list screen 333.

In the above, the equipment which transmits the data of the video image content is the video image distribution server 120 which also performs the purchase processing. However, the equipment which transmits the data of the video image content can differ from the equipment which performs the purchase processing.

In the above, the judgment result of the export propriety is displayed by the view as popup superimposed on other displays as shown in FIG. 4(D) and FIG. 8(D). However, the judgment result can be displayed with other displays on a part of the screen. For example, when the judgment result is displayed in step S110 at the time of the purchase of the video image content, the judgment result can be displayed on a part of the screen display of FIG. 4(E). In this case, the user can check the judgment result with the screen display in FIG. 4(E) when pushing the purchase procedure screen select button 157.

In the above processing of the first embodiment, only the judgment of the export propriety can be executed by a plug-in of the video image receiving terminal 100 with the other processing being processed by HTML data which is transmitted from the video image distribution server 120. Then, the one plug-in can be used for each judgment processing of the export propriety at the time of the purchase of the video image content and at the time of the export of the video image content.

Figure 5:
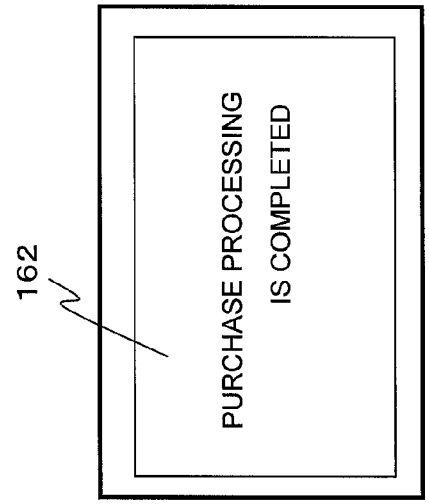
FIG. 5(A) is a diagram showing an example of a display of a screen for making user information required for purchase input according to the first embodiment of the present invention.
FIG. 5(B) is a diagram showing an example of a display of a screen to direct execution for purchasing the content according to the first embodiment of the present invention.
FIG. 5(C) is a diagram showing an example of a display of a screen to show completion of the content purchase according to the first embodiment of the present invention.
Figure 5:
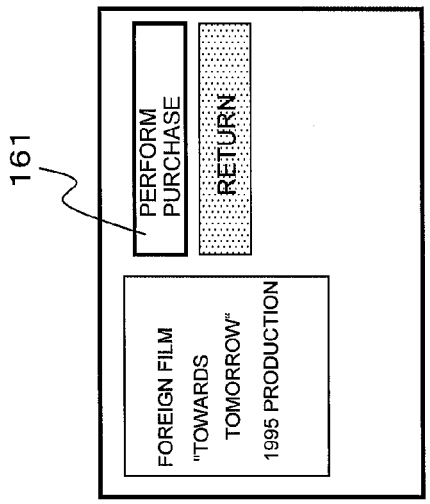
Figure 5:
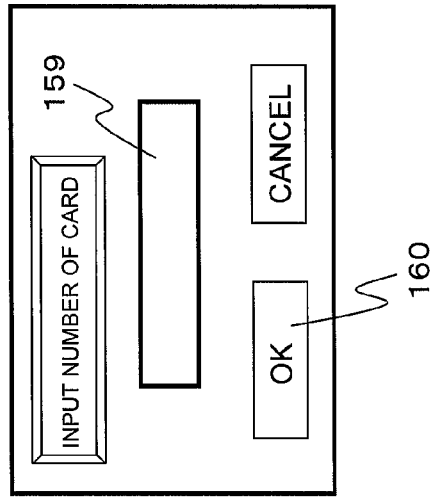
Figure 8:
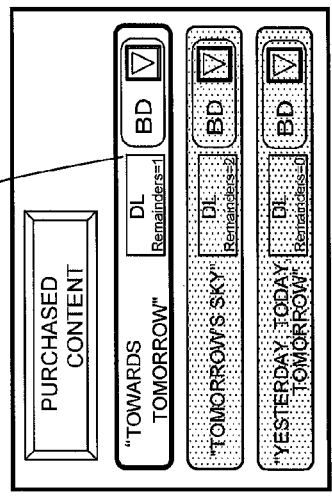
FIG. 8(A) is a diagram showing an example of a display of a list screen of purchased contents according to the first embodiment of the present invention.
FIG. 8(B) is a diagram showing an example of a display of a screen to select the kind of a removable medium according to the first embodiment of the present invention.
FIG. 8(C) is a diagram showing an example of a display of a screen when the kind of the removable medium and the video image content to be exported are selected according to the first embodiment of the present invention.
FIG. 8(D) is a diagram showing an example of a display of a screen to display a judgment result and a judgment reason at the time of the export of the video image content, according to the first embodiment of the present invention.
FIG. 8(E) is a diagram showing an example of a display of a screen to display a button for executing the export processing according to the first embodiment of the present invention.
FIG. 8(F) is a diagram showing an example of a display of a screen to display acceptance of the export processing and a start of the export according to the first embodiment of the present invention.
Figure 8:
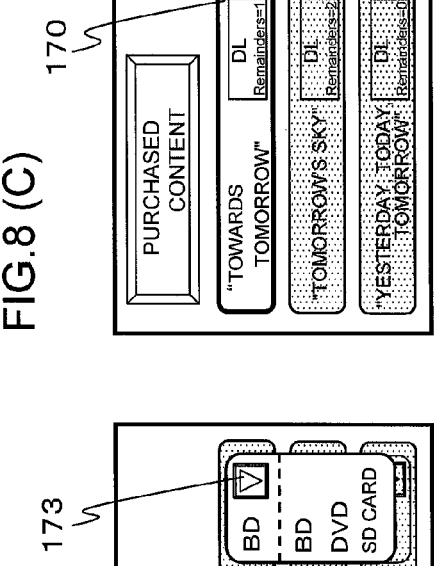
Figure 8:
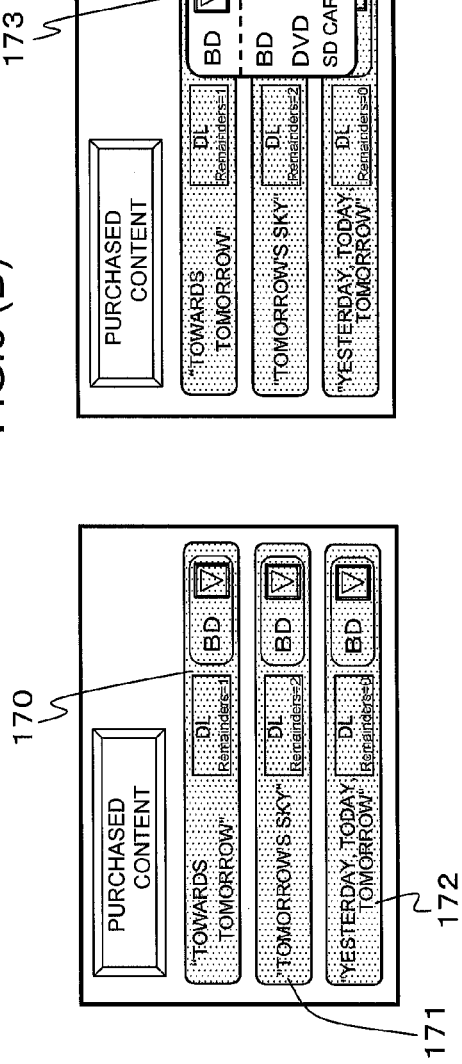
Figure 8:
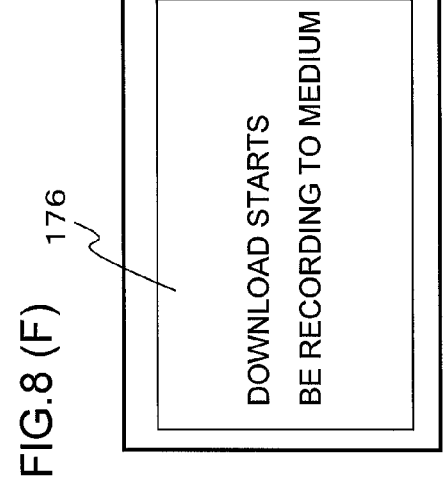
Figure 8:
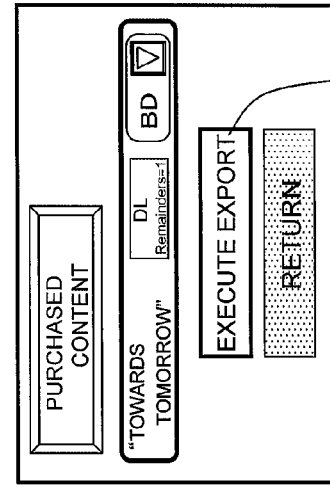
Figure 8:
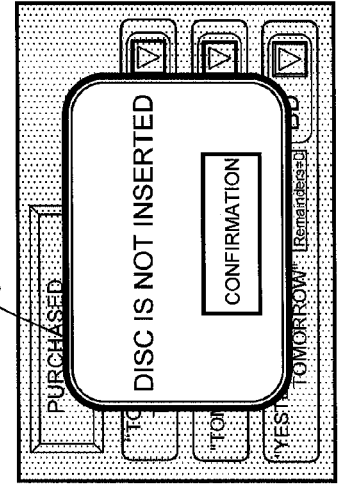

In this case, regarding the example of the screen displays in FIG. 4, FIG. 5 and FIG. 8, only judgment result displays 158 and 174, which are displayed as popup in FIG. 4(D) and FIG. 8(D) respectively, are displayed by the plug-in of the video image receiving terminal 100 while the other displays are displayed with the HTML data which is transmitted from the video image distribution server 120.

When processing in the control unit 103, the export propriety check unit 104, the terminal propriety check unit 105, the removable medium propriety check unit 106 or the like of the video image receiving terminal 100 is performed by the software processing which executes programs, it is possible to flexibly responded to processing changes or the like on the side of the video image distribution server 120.

Second Embodiment

In the first embodiment, the judgment of the export propriety is performed based on the performance and function of the video image receiving terminal and the removable disc. In a second embodiment of the present invention, the video image receiving terminal further performs the judgment of the export propriety also based on the contents provider's intention and the user's intention.

On broadcast recording, a transcode is generally performed for the convenience of recording equipment according to the state of the recording equipment or a recording medium. In the direct export service, the content may be a content such that the recording equipment is not permitted to make change processing such as an image compression ratio change processing because of a consent condition at the time of supply of the content from a contents producer to a contents dealer. Therefore, in the direct export service, it is desirable to, while taking the contents dealer's intention into consideration, make an execution judgment on an image compression ratio change processing or the like.

However, in the conventional broadcast programs, a content such that the recording equipment is not permitted to perform change processing does not exist. Of course, the conventional recording methods assume the broadcast programs do not need to perform such processing in consideration of the contents dealer's intention.

Further, in the direct export service, even if the user's intention is checked in the stage before acquisition of the content (i.e., before the direct export execution), it is believed that the purchase processing has been already completed. Therefore, a refund processing or the like has to be performed for the user who cannot permit image quality degradation and desires to cancel the purchase. In order to avoid this problem, it is necessary that the user should be asked for permission about the image compression ratio change and the image quality degradation according to the image compression ratio change before the user's judgment for purchase, so that the purchase is permitted to the user afterward. The conventional video image recording terminals assuming recording of the broadcast programs cannot avoid this problem.

The video image receiving terminal of the second embodiment considers the contents dealer's intention and the user's intention when the video image content is purchased, and avoids such a problem.

Figure 9:
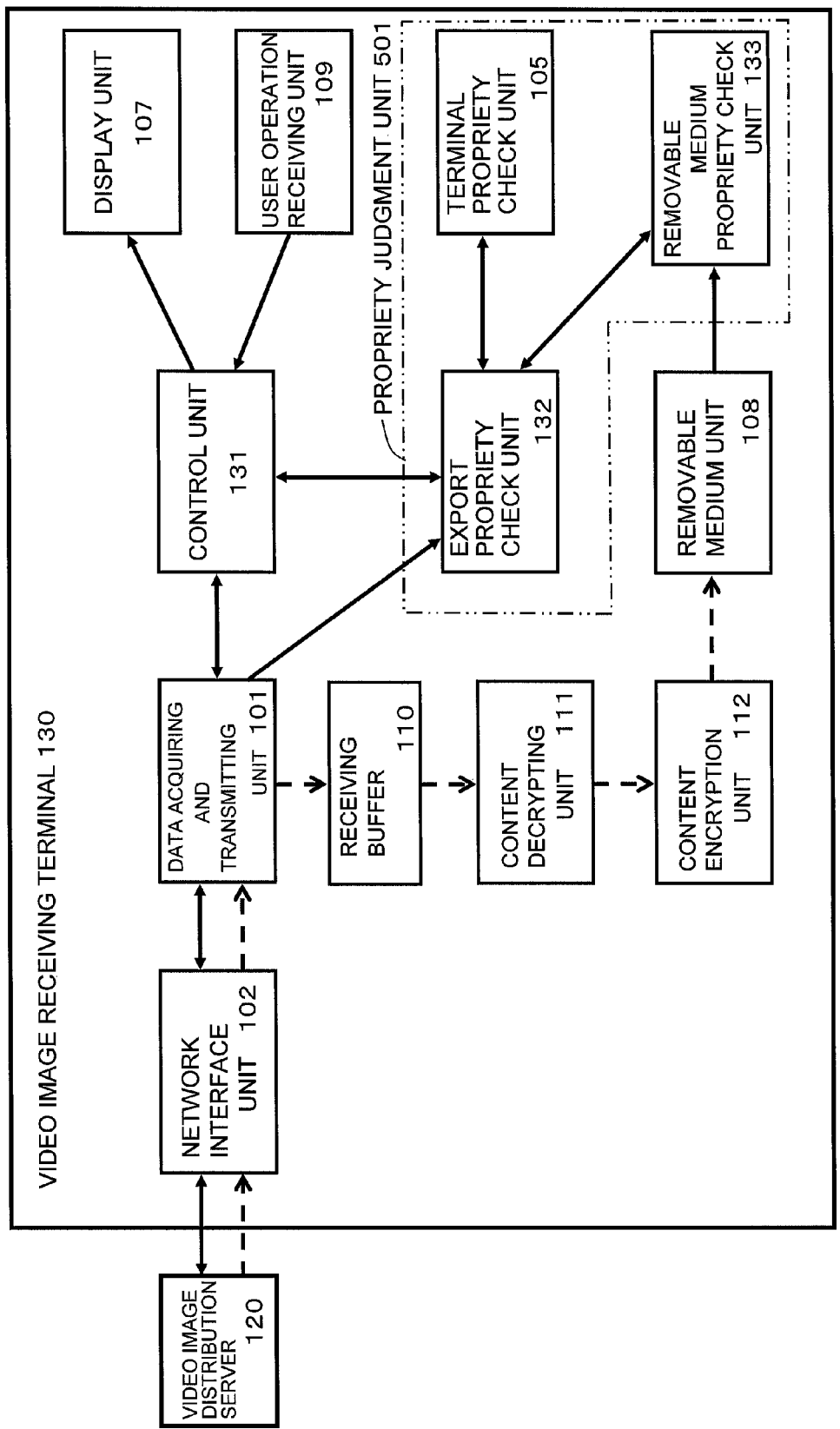
FIG. 9 is a block diagram showing a configuration of a video image receiving terminal according to a second embodiment of the present invention.

FIG. 9 shows a block diagram showing a configuration of the video image receiving terminal according to the second embodiment.

In FIG. 9, the components that are the same as those of the video image receiving terminal 100 according to the first embodiment shown in FIG. 1 are denoted by the same reference numerals. The configuration of the video image receiving terminal 130 according to the second embodiment is the same as the configuration of the video image receiving terminal 100 according to the first embodiment. In addition to the processing which are performed by each corresponding part of the video image receiving terminal 100, in the video image receiving terminal 130, the judgment processing according to the contents dealer's intention and the user's intention is performed by a control unit 131, a export propriety check unit 132 and a removable medium propriety check unit 133, respectively.

In the second embodiment, a construction of a propriety judgment unit 501 which includes the export propriety check unit 132, the terminal propriety check unit 105 and the removable medium propriety check unit 133, surrounded with a two-dot chain line in FIG. 9, corresponds to an example of a propriety judgment unit according to the present invention.

Figure 10:
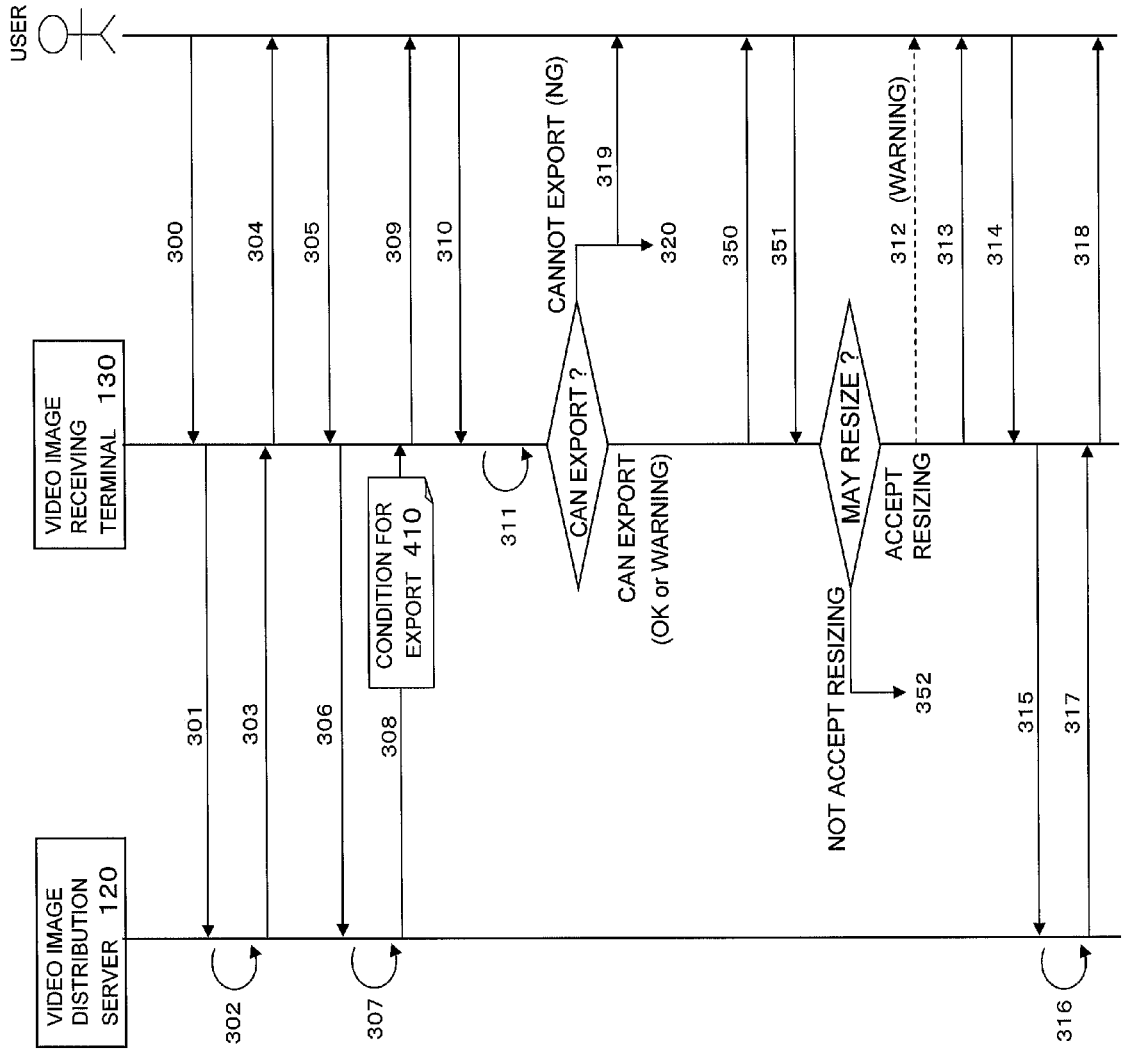
FIG. 10 is a diagram showing an operation and a communication sequence, of the video image receiving terminal and a video image distribution server at the time of a purchase of a video image content, according to the second embodiment of the present invention.
Figure 11:
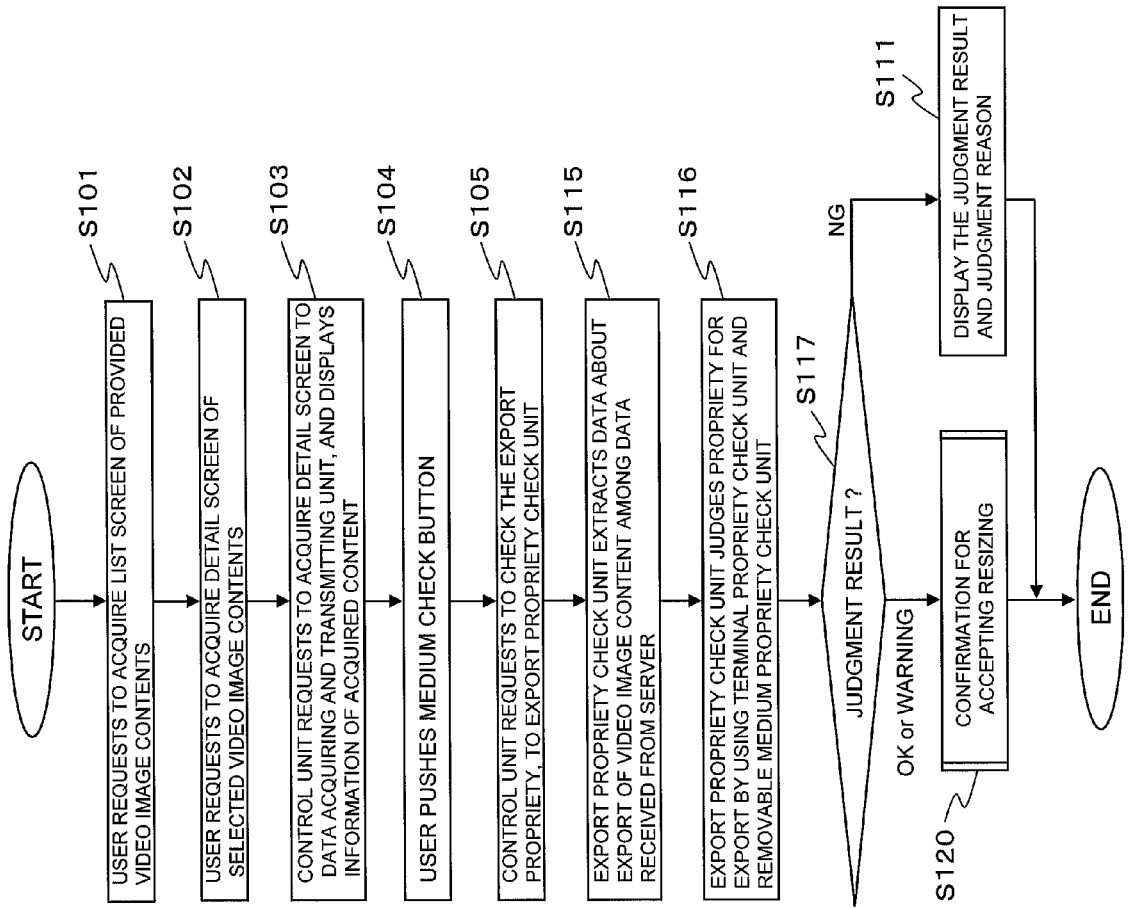
FIG. 11 is a flowchart showing a process which judges whether the export processing for the video image content can be performed in the video image receiving terminal at the time of the purchase of the video image content, according to the second embodiment of the present invention.
Figure 12:
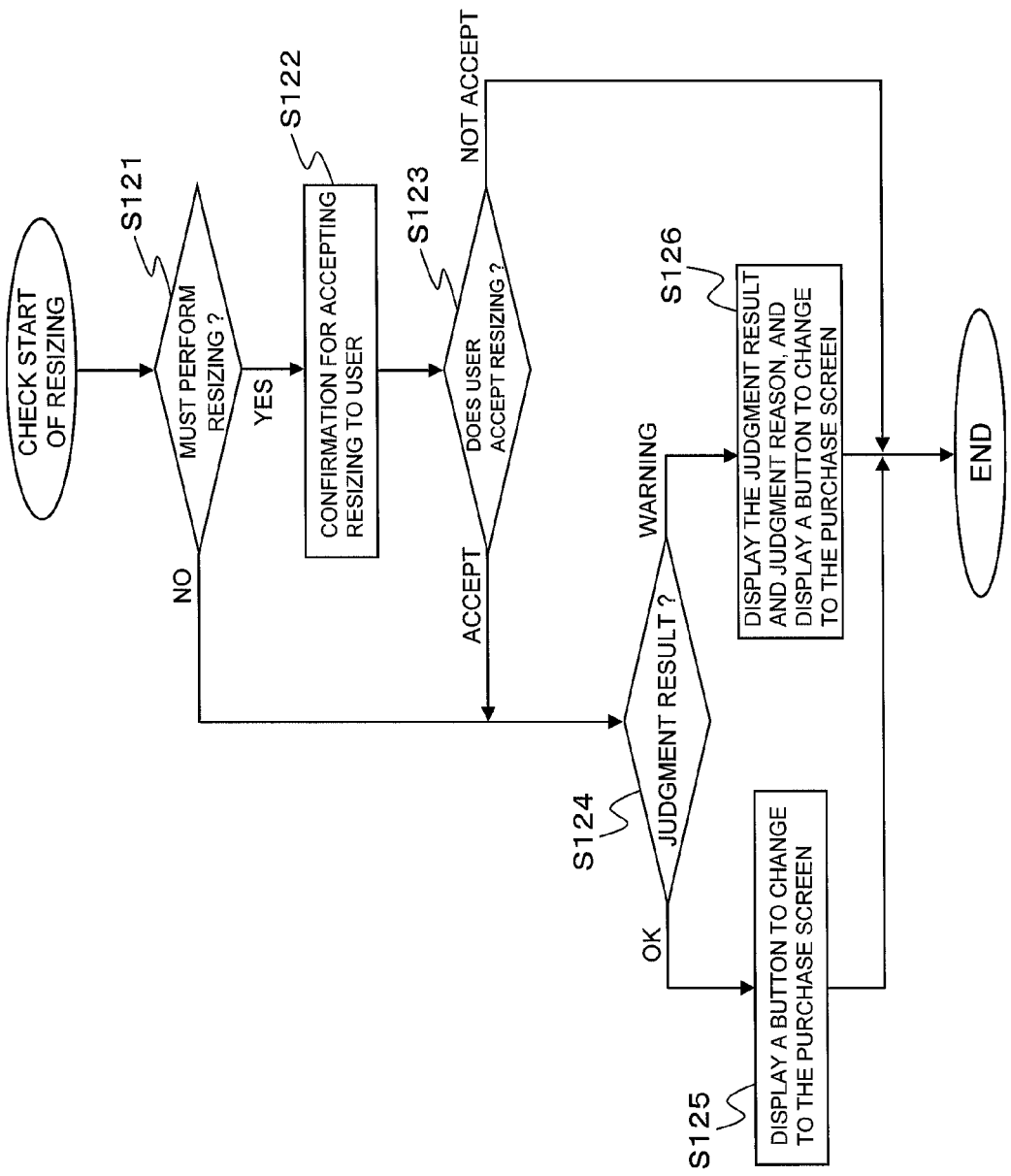
FIG. 12 is a flowchart showing a process which judges whether the export processing for the video image content can be performed based on a judgment for resizing by a user, in the video image receiving terminal at the time of the purchase of the video image content, according to the second embodiment of the present invention.
Figure 13:
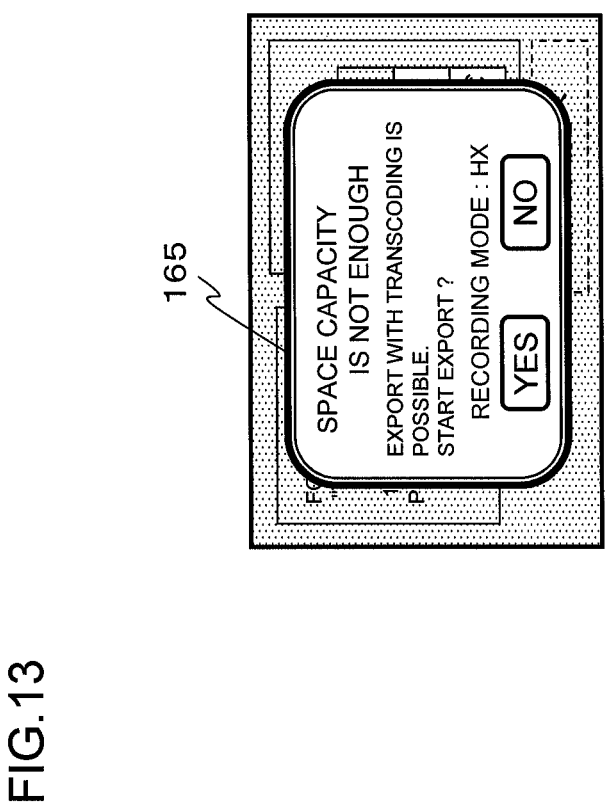
FIG. 13 is a diagram showing an example of a display which asks the user for permission of a transcode according to the second embodiment of the present invention.

FIG. 10 shows an operation and a communication sequence, in the video image receiving terminal 130 and the video image distribution server 120 at the time of the purchase of the video image content. FIG. 11 and FIG. 12 are flowcharts showing processes which judge whether the export can be performed in the video image receiving terminal 130 at the time of the purchase of the video image content. FIG. 13 shows an example of screen display displayed by the display unit 107 at the time of the purchase of the video image content. In FIG. 10 and FIG. 11, the processing portions that are the same as those in FIG. 2 and FIG. 3 according to the first embodiment are denoted by the same reference numerals.

The process which judges whether the export can be performed in the video image receiving terminal 130 at the time of the purchase of the video image content is described using FIGS. 9 to 13. The process different from the process in the video image receiving terminal 100 according to the first embodiment is described.

In FIG. 10, a condition 410 for export included in the content detail screen 308 which is transmitted from the video image distribution server 120 to the video image receiving terminal 130 includes a condition for resizing in addition to the information of the condition 400 for export according to the first embodiment.

The condition for resizing is information which shows whether the contents provider permits the transcode for the content or not. For example, the condition for resizing is expressed as "true" when the transcode is permitted, and the condition for resizing is expressed as "false" when the transcode is not permitted. For example, the condition for resizing is shown by the two values of "true" and "false". The transcode for the content is processing which changes the resolution of the content or the data size of the content. The transcode for the content can be processing which subsamples the data. The transcode for the content can be processing which decodes the content once, changes the information such as the bit rate of the data and encodes the data again.

In the flow of FIG. 11, the processing from step S101 to step S105 are the same as that of the first embodiment, the description for the processing is thus omitted. The processing after step S115 is described.

The export propriety check unit 132, which has received the export propriety check request from the control unit 131, acquires data of the content detail screen from the data acquiring and transmitting unit 101 and extracts the condition 410 for export included in the data (step S115).

The export propriety check unit 132, which has extracted the condition for export 410, transmits, to the terminal propriety check unit 105, data that is required for the terminal propriety check unit 105, and the export propriety check unit 132 also transmits, to the removable medium propriety check unit 133, data that is required for the removable medium propriety check unit 133. And the export propriety check unit 132 requests the export propriety checks of the terminal propriety check unit 105 and the removable medium propriety check unit 133, respectively. At this time, the condition for resizing is included in the required data that is transmitted to the removable medium propriety check unit 133.

The terminal propriety check unit 105 compares the data transmitted from the export propriety check unit 132 with the capability the video image receiving terminal 130 possesses, and the terminal propriety check unit 105 checks the propriety about the video image receiving terminal 130. The removable medium propriety check unit 133 compares the data transmitted from the export propriety check unit 132 with the capability the removable medium unit 108 selected by the user at step S104 possesses, and the removable medium propriety check unit 133 checks the propriety about the removable medium unit 108.

Even when the size of the video image content is too large and cannot be recorded on the removable medium unit 108 with the downloading form, the removable medium propriety check unit 133 compares a space capacity in the removable medium unit 108 with the data size of the video image content after compression and judges the propriety for the export when the transcode is permitted in the condition for resizing. When the size of the video image content is too large and cannot be recorded on the removable medium unit 108 with the downloading form and the transcode is also not permitted in the condition for resizing (i.e., when the contents provider does not permit the transcode of the video image content), the removable medium propriety check unit 133 judges that the export cannot be performed.

The terminal propriety check unit 105 and the removable medium propriety check unit 133 transmit respective check results to the export propriety check unit 132. The export propriety check unit 132, which has received the check results, judges whether the export can be performed or not (step S116).

The export propriety check unit 132 transmits the judgment result to the control unit 131. The control unit 131, which has received the judgment result, changes the display request for the display unit 107 according to the judgment result (step S117).

When it is recognized that a problem which cannot be restored is occurring (the case of "NG") as a result of the judgment in step S117, the control unit 131 requests the display unit 107 to display the judgment result and the judgment reason on the screen (step S111), as is the case with the first embodiment. Specific examples of such a case where the problem which cannot be restored is occurring are as follows:

(i) the video image receiving terminal 130 is not applicable for the direct export service, and (ii) the video image receiving terminal 130 has broken down and cannot execute the direct export processing.

When it is recognized that there is no problem (the case of "OK") or that a problem which can be restored is occurring (the case of "WARNING") as a result of the judgment in step S117, the control unit 131 performs a resizing acceptance check process, as is not the case with the first embodiment. Specific examples of such a case where the problem which can be restored is occurring are as follows: (i) the removable medium unit 108 does not have enough capacity, (ii) the removable medium unit 108 is not inserted, and (iii) the inserted removable medium unit 108 is not applicable for the direct export but the export can be performed by changing the inserted removable medium unit 108.

FIG. 12 shows a flowchart of the process for checking the resizing acceptance in step S120 in the control unit 131.

In the process of step S120, the control unit 131 first judges whether the video image content can be recorded with the downloading form and whether the video image content after compression can be recorded, in order to record the specified video image content on the removable medium unit 108 (step S121).

When the video image content cannot be recorded with the downloading form into the removable medium 108 but the video image content after compression can be recorded (when it is judged that the resizing is necessary in step S121), the control unit 131 checks the user's acceptance by the display unit 107 and the user operation receiving unit 109 (step S122). The control unit 131 displays a resizing acceptance check screen 350 as shown, for example, in FIG. 13.

When the user selects the removable disc, on which the content will be recorded, for the export in the screen of FIG. 4(C), the resizing acceptance check screen shown in FIG. 13 is displayed. The display unit 107 carries out the view as popup of a user acceptance check display 165 as shown in FIG. 13 on the screen display of FIG. 4(C).

When the user looks at the display in FIG. 13, the user can check that the capacity is insufficient to store the content into the BD, which is the selected medium in the screen of FIG. 4(C), without transcoding the video image content. And the user is asked about the acceptance of the size compression of the video image content and recording in the recording mode "HX".

When the user accepts transcoding (i.e., when the user pushes the "YES" button in the screen display of FIG. 13), the user operation receiving unit 109 notifies a check result 351 of resizing acceptance to the control unit 131.

The control unit 131 checks whether the resizing has been accepted by the user or not (step S123). When the resizing is not accepted, the control unit 131 ends the content purchase processing 352.

When it is judged that the video image content can be recorded on the removable medium unit 108 without resizing in step S121 or that the resizing for the video image content is accepted by the user in step S123, the control unit 131 changes the display request for the display unit 107 according to the judgment result received from the export propriety check unit 132 (step S124).

The processing of step S125 and step S126 shown in FIG. 12 are the same as the processing of step S109 and step S110 shown in FIG. 3 according to the first embodiment, respectively.

In other words, when it is recognized that there is no problem (the case of "OK") as a result of the judgment in step S124, the control unit 131 requests the display unit 107 to display the button to direct changing to the purchase screen on the screen and the display is changed to the purchase screen as shown in FIG. 4(E) (step S125). When it is recognized that a problem which can be restored is occurring (the case of "WARNING") as a result of the judgment in step S124, the control unit 131 requests the display unit 107 to display the judgment result and the judgment reason on the screen so that the screen displaying the judgment result and judgment reason is displayed as shown in FIG. 4(D). When the user pushes the check button in the screen of FIG. 4(D), the display is changed to the purchase screen as shown in FIG. 4(E) (step S126).

When two or more video image contents are purchased collectively, the condition for resizing can be set up by consolidating the conditions for the two or more video image contents.

For example, when a video image content which is not permitted to be transcoded is contained in the two or more video image contents to collectively purchase, the control unit 131 can regard all the video image contents as not being permitted to be transcoded.

In the second embodiment, permission information of transcoding for the video image content is described as an example of the condition for resizing. However, another condition in consideration of the contents dealer's intention can be used as the condition for resizing. Specific examples of such a condition are as follows: (i) transcoding is permitted but resizing with a predetermined compression ratio or more is only permitted, (ii) transcoding is permitted but resizing with a predetermined resolution or more is only permitted, (iii) conversion by a predetermined conversion method is only permitted, and (iv) transcoding with a predetermined security standard is only permitted.

As described above, the second embodiment can provide a video image receiving terminal or the like which can make a judgment on acquisition of the content in accordance with the user's intention and the contents dealer's intention. Then, the second embodiment can contribute to the improvement in the CS of the content distribution service.

In the above descriptions of each embodiment, the video image content is used as an example of the content of the present invention. However, the present invention is applicable also to music, a picture, a text or the like.

The non-transitory computer-readable medium of the present invention is a recording medium having recorded thereon a program of the above-described content exporting method of the present invention and is a recording medium, the program of which, when read, is used in cooperation with the computer.

The computer according to the present invention described above is not limited to pure hardware such as a CPU and may include firmware, an OS, and peripheral equipment.

As described above, the configuration of the present invention may be realized in terms of software or may be realized in terms of hardware.

As described above, the receiving terminal according to the present invention judges not only the propriety about the receiving terminal but also the propriety about the removable medium on which the downloaded content will be recorded. For example, in the direct export service, errors at the time of the export execution can be reduced greatly.

In the receiving terminal according to the present invention, the processing for the judgment result of the export propriety at the time of the purchase of a content differs from the processing for the judgment result of the export propriety at the time of the export execution. When it is considered possible for a user to successfully perform the export with the receiving terminal at the time of intended export execution, the purchase processing is allowed to be performed. For example, even when a removable disc to which the content can be exported is not set, the export can be performed by changing the removable disc. Therefore, even when a removable disc to which the content can be exported is not set at the time of the purchase of the content, the user is allowed to purchase the content. In this case, when a removable disc to which the content can be exported is still not set at the time of the export execution, the export execution is not allowed to be performed. Therefore, errors after the download start of the content can be prevented.

The receiving terminal, the content exporting method and the like according to the present invention have an effect of enabling judgment of the propriety of the receiving terminal and the propriety of the removable medium, on which a content will be recorded, for the direct export for the content, and are useful as a receiving terminal, a content exporting method or the like having functions of downloading a content trough a communication network to export the content into a removable medium directly.

What is claimed is:

1. A receiving terminal which receives a content from a content server providing a content download service and performs a direct export service by which the content can be recorded directly to a removable medium,
the receiving terminal comprising:
a data acquiring unit which acquires from the content server information that is required for export of the content and that includes information about a capability required for the receiving terminal and information about a capability required for the removable medium;
a propriety judgment unit which compares the information about the capability required for the receiving terminal with information about a capability the receiving terminal possesses, compares the information about the capability required for the removable medium with information about a capability the removable medium possesses, and judges whether or not export processing of the content can be performed; and
a control unit which makes a processing relevant to a purchase of the content or to the export of the content perform, according to a judgment result by the propriety judgment unit, wherein
the propriety judgment unit judges, at the judgment of whether or not the export processing can be performed, that the export processing is possible, the export processing is impossible but a restoration is possible, or the export processing is impossible and the restoration is impossible,
at a time of purchase, the control unit makes such display of a purchase screen when it is judged that the export processing is possible, the control unit makes such display that the export processing is impossible and further makes such display of the purchase screen when it is judged that the export processing is impossible but the restoration is possible, and the control unit makes such display that the export processing is impossible and does not make such display of the purchase screen when it is judged that the export processing is impossible and the restoration is impossible, and
at a time of export execution, the control unit makes such display of a screen for directing an execution of the export when it is judged that the export processing is possible, the control unit makes such display that the export processing is impossible and does not make such display of the screen for directing the execution of the export when it is judged that the export processing is impossible but the restoration is possible or when it is judged that the export processing is impossible and the restoration is impossible.

2. The receiving terminal according to claim 1, wherein
it is judged that the export processing is impossible but the restoration is possible, when the removable medium does not have enough capacity, or when the removable medium is not inserted to the receiving terminal, or when the removable medium is not applicable for the direct export service, and
it is judged that the export processing is impossible and the restoration is impossible, when the receiving terminal is not applicable for the direct export service, or when the receiving terminal breaks down.

3. The receiving terminal according to claim 1, wherein
the purchase screen and the screen for directing the execution of the export are screens sent from the content server which receives the judgment result of the propriety judgment unit, from the receiving terminal.

4. A receiving terminal which receives a content from a content server providing a content download service and performs a direct export service by which the content can be recorded directly to a removable medium,
the receiving terminal comprising:
   a data acquiring unit which acquires from the content server information that is required for export of the content and that includes information about a capability required for the receiving terminal and information about a capability required for the removable medium;
   a propriety judgment unit which compares the information about the capability required for the receiving terminal with information about a capability the receiving terminal possesses, compares the information about the capability required for the removable medium with information about a capability the removable medium possesses, and judges whether or not export processing of the content can be performed; and
   a control unit which makes a processing relevant to a purchase of the content or to the export of the content perform, according to a judgment result by the propriety judgment unit, wherein
   the information about the capability required for the removable medium includes a condition for resizing,
   at a time of purchase of the content, when the propriety judgment unit judges that the export processing is possible or the export processing is impossible but restoration is possible and the content is unrecordable on the removable medium if resizing is not executed, the control unit asks a user whether or not the user accepts the resizing, and does not make display of a purchase screen when the user does not accept the resizing.

5. A content exporting method in a receiving terminal which receives a content from a content server providing a content download service and performs a direct export service by which the content can be recorded directly to a removable medium, the content exporting method comprising:
   a first judgment step of, by the receiving terminal at a time of purchase of the content, acquiring information which is required for export of the content to purchase, comparing the information with information about a capability the receiving terminal possesses and information about a capability the removable medium possesses, and judging, about whether export processing of the content can be performed, that the export processing is possible, that the export processing is impossible but a restoration is possible, or that the export processing is impossible and the restoration is impossible;
   a first display step of making such display of a purchase screen when it is judged that the export processing is possible in the first judgment step, making such display that the export processing is impossible and further making such display of the purchase screen when it is judged that the export processing is impossible but the restoration is possible in the first judgment step, or making such display that the export processing is impossible and not making such display of the purchase screen when it is judged that the export processing is impossible and the restoration is impossible in the first judgment step;
   a purchase decision step of deciding a purchase processing when a user inputs to decide the purchase in the purchase screen through an operation screen;
   a second judgment step of, by the receiving terminal at a time of export execution of the content, acquiring information which is required for the export or new information which is required for the export, comparing the information with the information about the capability the receiving terminal possesses and the information about the capability the removable medium possesses, and judging whether or not the export processing can be performed;
   a second display step of making such display of a screen for directing an execution of the export when it is judged that the export processing is possible in the second judgment step, making such display that the export processing is impossible and not making such display of the screen for directing the execution of the export when it is judged that the export processing is impossible but the restoration is possible or when it is judged that the export processing is impossible and the restoration is impossible; and
   an export execution step of executing the export when the user directs to execute the export in the screen for directing the execution of the export through the operation screen.

6. A non-transitory computer-readable medium having a program stored thereon, wherein the program causes a computer to execute the content exporting method according to claim 5.

* * * * *